(12) United States Patent
Ou

(10) Patent No.: US 11,388,194 B2
(45) Date of Patent: Jul. 12, 2022

(54) IDENTITY VERIFICATION AND VERIFYING DEVICE

(71) Applicant: Huawei Cloud Computing Technologies Co., Ltd., Shenzhen (CN)

(72) Inventor: Duanhao Ou, Dongguan (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 86 days.

(21) Appl. No.: 16/899,163

(22) Filed: Jun. 11, 2020

(65) Prior Publication Data
US 2020/0304541 A1 Sep. 24, 2020

Related U.S. Application Data

(63) Continuation of application No. PCT/CN2018/120815, filed on Dec. 13, 2018.

(30) Foreign Application Priority Data

Dec. 13, 2017 (CN) .......................... 201711330350.4
Dec. 12, 2018 (CN) .......................... 201811514952.X

(51) Int. Cl.
*G06F 7/04* (2006.01)
*G06F 15/16* (2006.01)
(Continued)

(52) U.S. Cl.
CPC ........ *H04L 63/1483* (2013.01); *H04L 63/083* (2013.01); *H04L 63/12* (2013.01); *H04L 63/166* (2013.01); *H04L 63/20* (2013.01)

(58) Field of Classification Search
USPC ............................................................. 726/5
See application file for complete search history.

(56) References Cited

U.S. PATENT DOCUMENTS

| 8,078,881 | B1 | 12/2011 | Liu |
| 2006/0059362 | A1 | 3/2006 | Paden et al. |

(Continued)

FOREIGN PATENT DOCUMENTS

| CN | 103179098 A | 6/2013 |
| CN | 103442002 A | 12/2013 |

(Continued)

OTHER PUBLICATIONS

Gelernter, N., et al., "The Password Reset MitM Attack," 2017, IEEE Symposium on Security and Privacy, pp. 251-267.

(Continued)

*Primary Examiner* — Fatoumata Traore
*Assistant Examiner* — Samuel Ambaye
(74) *Attorney, Agent, or Firm* — Conley Rose, P.C.

(57) ABSTRACT

An identity verification method and a verifying device, where the verifying device receives an account for requesting password reset. When the account is invalid, the verifying device sends a fake identification and a first verification request to a requesting device. The verification request mentioned requests a user to determine whether to send verification information to a first communication address. The fake identification and the first communication address are associated with the first account.

20 Claims, 25 Drawing Sheets

(51) Int. Cl.
*H04L 29/06* (2006.01)
*H04L 9/40* (2022.01)

(56) References Cited

U.S. PATENT DOCUMENTS

| | | | |
|---|---|---|---|
| 2008/0120508 A1 | 5/2008 | Marconi et al. | |
| 2010/0125906 A1* | 5/2010 | Golle | H04L 9/3226 726/18 |
| 2015/0178493 A1* | 6/2015 | Liu | H04L 63/0884 726/6 |

FOREIGN PATENT DOCUMENTS

| CN | 103795724 A | 5/2014 |
|---|---|---|
| CN | 104239779 A | 12/2014 |
| CN | 104301110 A | 1/2015 |
| CN | 104579667 A | 4/2015 |
| CN | 105868621 A | 8/2016 |
| CN | 105989484 A | 10/2016 |
| CN | 106411517 A | 2/2017 |
| CN | 104182666 B | 5/2017 |
| CN | 106845181 A | 6/2017 |
| WO | 2015062278 A1 | 5/2015 |

OTHER PUBLICATIONS

OWASP, "OWASP Cheat Sheet Series—Forgot Password Cheat Sheet," May 22, 2017, 5 pages.
Xiaoqiang, Z, "How does a hacker hack into a Facebook account?," Aug. 31, 2016, 7 pages.
"The OWASP Internet of Things Top Ten for 2014," retrieved from : https://owasp.org/www-pdf-archive/Internet_of_Things_Top_Ten_2014-OWASP.pdf on Aug. 20, 2020, 37 pages.
Fielding, R., et al., "Hypertext Transfer Protocol—HTTP/1.1," RFC 2616, Jun. 1999, 114 pages.
Grassi, P., et al., "NIST Special Publication 800-63B, Digital Identity Guidelines (Authentication and Lifecycle Management)," Jun. 2017, 87 pages.

* cited by examiner

IDENTITY VERIFICATION AND VERIFYING DEVICE

CROSS-REFERENCE TO RELATED APPLICATIONS

This application is a continuation of International Patent Application No. PCT/CN2018/120815 filed on Dec. 13, 2018, which claims priority to Chinese Patent Application No. 201711330350.4 filed on Dec. 13, 2017 and Chinese Patent Application No. 201811514952.X filed on Dec. 12, 2018. All of the aforementioned patent applications are hereby incorporated by reference in their entireties.

TECHNICAL FIELD

This application relates to the field of identity authentication, and in particular, to a password reset method, a requester, and a verifier.

BACKGROUND

When a requester (for example, a client) logs in to an application program, the requester usually requests, using an account and a password, a verifier of the application program to verify an identity. If a user forgets a login password, the user cannot access a corresponding service in the application program. To recover the user's access to the service, a login interface of the requester of the application program needs to provide a function such as "forgot password", "retrieve password", or "reset password" for the user to reset the password corresponding to the account in order to obtain a new login password for the application program.

If a password reset mechanism has a defect, it may be utilized by an attacker as a vulnerability of the entire application program. Even if a hacker fails in brute-force cracking on the original password of the user, the hacker may successfully reset the password for the account by utilizing the vulnerability of the password reset mechanism.

Therefore, how to avoid a vulnerability of a password reset mechanism becomes an urgent problem to be resolved.

SUMMARY

This application provides a password reset method, a requester, and a verifier, to reduce a password reset vulnerability quantity or avoid a password reset vulnerability while ensuring user experience.

According to a first aspect, a password reset method is provided, which is applied to a system including a requester and a verifier, where the requester needs to request, using an account and a password, the verifier to verify an identity, and the method includes receiving, by the verifier, an account sent by the requester for requesting password reset, and when the account is a valid account, sending, by the verifier, first confirmation information to the requester, where the first confirmation information is used to enable the requester to display, to a user, first binding information associated with the account, and request the user to determine whether to send verification information to a first communication address associated with the account, and the first binding information is information that corresponds to the account and that is known by the user, or when the account is an invalid account, generating, by the verifier based on the account, second binding information corresponding to the account, and sending, to the requester, second confirmation information having a same form as the first confirmation information, where the second confirmation information is used to enable the requester to display the second binding information to the user, and request the user to determine whether to send verification information to a second communication address corresponding to the account, and the second binding information and the first binding information have a same form.

It should be understood that, in this embodiment of this application, when the verifier verifies that the account is valid, the requester displays the first binding information that is associated with the account and that is known by the user. The first binding information is information prestored by the verifier, and does not need to be generated by the verifier. When the verifier verifies that the account is invalid, the verifier generates the second confirmation information that corresponds to the invalid account and whose form is consistent with that of the first confirmation information, and returns the second confirmation information to a requester interface. That is, the verifier generates binding information (the second binding information) only when the account is invalid. If the account is valid, the verifier does not need to generate binding information.

Therefore, in this application, corresponding fake confirmation information (namely, the second confirmation information) whose form is consistent with that of the first confirmation information is generated for the invalid account. Because the form of the fake confirmation information needs to be consistent with a form of confirmation information corresponding to a real account, a hacker cannot determine validity of the entered account using the confirmation information. Therefore, in this embodiment of this application, a problem that the hacker enumerates valid accounts using prompt information "invalid account" returned by a server can be resolved, and system security performance can be improved.

In addition, in this application, information known by the user or preset information is used as confirmation information. For the hacker, when the hacker does not know whether the account is valid, the hacker cannot know confirmation information corresponding to the account either. Therefore, when the server returns confirmation information, the hacker cannot identify whether the confirmation information is authentic. However, for a common user, if an incorrect account is entered, the common user may identify, using known information or preset information (namely, the foregoing first binding information), that returned information does not belong to the common user (the information is confirmation information for another user, or is fake confirmation information). Therefore, in this embodiment of this application, a problem that the user cannot perceive, in a timely manner, whether "an invalid account is entered" or "an account of another user is mistakenly entered" can also be resolved, and user experience can be improved.

Optionally, in some implementations of the first aspect, the password includes a personal identification number (PIN), a key, a private key, or a character string specified by the user, and the account includes an email address, a mobile phone number, an account of a third-party application, or a character string registered by the user with the verifier.

After obtaining the first confirmation information, the requester may display the first binding information to the user, and request the user to determine whether to send the verification information to the first communication address. For example, content displayed by the requester is "the first binding information is xx, please determine whether to send verification information to a first communication address associated with the account". It should be understood that, in this case, the first binding information may be directly displayed information (that is, a specific address is displayed), but specific address information of the first communication address may not be displayed.

Optionally, in some implementations of the first aspect, the first binding information is the first communication address, and the second binding information is the second communication address.

That is, after obtaining the first confirmation information, the requester may request the user to "determine whether to send verification information to a first communication address". The first communication address herein is the foregoing first binding information, and the first communication address is directly displayed information (that is, a specific address is displayed).

It should be understood that, in this embodiment of this application, the second binding information corresponding to the invalid account may be generated using a plurality of algorithms, provided that only same binding information is generated for a same invalid account entered for a plurality of times. This embodiment of this application is not limited thereto.

Optionally, in some implementations of the first aspect, generating, by the verifier based on the account, second binding information corresponding to the account when the account is an invalid account includes generating, by the verifier based on the account and a first key, the second binding information corresponding to the account.

Further, to guard against a malicious internal person (for example, a programmer or an insider) who knows a process of generating fake confirmation information, when the fake confirmation information is generated, a secret (which may also be referred to as a key) such as a key string may be introduced when the second binding information is generated in this embodiment of this application. The verifier stores the secret, and generates the fake confirmation information with participation of the secret. Therefore, the malicious internal person cannot determine a relationship between the fake confirmation information and the invalid account without knowing the secret.

Therefore, in this embodiment of this application, the key is introduced before the fake confirmation information for the invalid account is generated, and the key and the invalid account are used together to generate the fake confirmation information (i.e., the second binding information). Therefore, the malicious internal person knowing the process of generating the fake confirmation information cannot determine the relationship between the fake confirmation information and the invalid account without knowing the secret. System security performance can be improved in this embodiment of this application.

Optionally, in some implementations of the first aspect, generating, by the verifier based on the account and a first preset key, the second binding information corresponding to the account includes obtaining, by the verifier, the first key, combining, by the verifier, the first key and the account, to generate combined data, and generating, by the verifier, the second binding information based on the combined data using a first function algorithm, where the first function algorithm is used to generate output information uniquely corresponding to one piece of input information.

It should be understood that, in this embodiment of this application, the first function algorithm may be a plurality of types of algorithms such as a random seed-based generation algorithm, a hash-based generation algorithm, or an iteration-based generation algorithm, provided that the first function algorithm can be used to generate uniquely corresponding output information (the second binding information) for a same piece of input information (the combined data). This embodiment of this application is not limited thereto.

Optionally, in some implementations of the first aspect, the first communication address and the second communication address are anonymous information, the first confirmation information is used to enable the requester to request the user to determine whether to send the verification information to the first communication address associated with the account, and enable the requester to request the user to enter an anonymous part of the first communication address, and the second confirmation information is used to enable the requester to request the user to determine whether to send the verification information to the second communication address associated with the account, and enable the requester to request the user to enter an anonymous part of the second communication address.

Optionally, in some implementations of the first aspect, the method further includes obtaining, by the verifier, a message that is sent by the requester and that indicates that the user determines to send the verification information, where the message that indicates that the user determines to send the verification information carries the anonymous part entered by the user, and when the account is the valid account and the anonymous part entered by the user is correct, sending, by the verifier, the verification information to the first communication address, and sending a fourth response message to the requester, where the fourth response message is used to enable the requester to prompt the user that the verifier has sent the verification information to the first communication address, or when the account is the invalid account or the anonymous part entered by the user is incorrect, directly sending, by the verifier to the requester, a fifth response message having a same form as the fourth response message, where the fifth response message is used to enable the requester to prompt the user that the verifier has sent the verification information to the second communication address.

Optionally, in some implementations of the first aspect, the method further includes obtaining, by the verifier, a message that is sent by the requester and that indicates that the user determines to send the verification information, where the message that indicates that the user determines to send the verification information carries the anonymous part entered by the user, when the account is the valid account and the anonymous part entered by the user is correct, sending, by the verifier, a sixth confirmation message to the requester, where the sixth confirmation message is used to enable the requester to request the user to confirm sixth binding information associated with the account, and the sixth binding information is information that corresponds to the account and that is known by the user, and after the verifier obtains a message that is sent by the requester and that indicates that the user confirms the sixth binding information, sending, by the verifier, the verification information to the first communication address, and sending a sixth response message to the requester, where the sixth response message is used to enable the requester to prompt the user that the verifier has sent the verification information to the first communication address, or the method further includes obtaining, by the verifier, a message that is sent by the requester and that indicates that the user determines to send the verification information, where the message that indicates that the user determines to send the verification information carries the anonymous part entered by the user, when the account is the invalid account or the anonymous part entered by the user is incorrect, generating, by the verifier based on the anonymous part entered by the user and/or the account, seventh binding information corresponding to the account, and sending a seventh confirmation message to the requester, where the seventh confirmation message is used to enable the requester to request the user to confirm the seventh binding information associated with the account, and the seventh binding information and the sixth binding information have a same form, and after the verifier obtains a message that is sent by the requester and that indicates that the user confirms the seventh binding information, directly sending, by the verifier to the requester, a seventh response message having a same form as the sixth response message, where the seventh response message is used to enable the requester to prompt the user that the verifier has sent the verification information to the second communication address.

When the confirmation information is returned, the user may be required to enter known preset information (for example, enter an anonymous part of the preset information) in this embodiment of this application. The server triggers a real send operation only when the account is valid and entered preset information is correct. Therefore, interference caused by brute-force cracking to a common user can be avoided in this application.

Optionally, in some implementations of the first aspect, the method further includes obtaining, by the verifier, a message that is sent by the requester and that indicates that the user determines to send the verification information, and when the account is the valid account, sending, by the verifier, the verification information to the first communication address, and sending a first response message to the requester, where the first response message is used to prompt the user that the verifier has sent the verification information to the first communication address, or when the account is the invalid account, directly sending, by the verifier to the requester, a second response message having a same form as the first response message, where the second response message is used to prompt the user that the verifier has sent the verification information to the second communication address.

Therefore, in this application, corresponding fake confirmation information in a consistent form is generated for the invalid account, and regardless of any operation performed by the user in a client interface in which the fake confirmation information is returned, the server returns a response message consistent with that for the valid account. First, a form of the fake confirmation information needs to be consistent with that of confirmation information corresponding to a real account. In this way, a hacker cannot determine validity of the entered account using the confirmation information. In addition, regardless of any operation performed by the user in the client interface in which the fake confirmation information is returned, the server returns the response message consistent with that for the valid account. In this way, the hacker also cannot determine the validity of the entered account using the response message. In conclusion, a problem that a hacker enumerates valid accounts using prompt information "invalid account" returned by a server in an existing method is resolved in this application.

Optionally, in some implementations of the first aspect, when the account is invalid, regardless of any input performed by the user in an "enter a mobile phone verification code" interface, the verifier may directly return "the entered mobile phone verification code is invalid".

Optionally, when the account is valid, if the user enters incorrect verification information in an "enter a mobile phone verification code" interface, the verifier may also directly return "the entered mobile phone verification code is invalid".

Because the hacker cannot receive short message service (SMS) verification code, the hacker does not know whether "the entered mobile phone verification code is invalid" displayed by the requester is a feedback corresponding to an invalid account or a feedback corresponding to an incorrectly entered valid account. Therefore, a password reset vulnerability can be avoided.

Optionally, in some implementations of the first aspect, the method further includes when the verifier determines that a quantity of consecutive times for which the user requests password reset for the invalid account using the requester reaches a preset threshold, locking the request from the requester to the verifier.

Because the invalid account cannot be used to obtain verification information, the invalid account cannot be used to perform a subsequent password reset process. In actual application, an attacker may continuously request password reset for a plurality of invalid accounts. This may cause network congestion, and affect system performance. For this problem, in this embodiment of this application, when the server verifier determines that the quantity of consecutive times for which the user requests password reset for the invalid account using the requester reaches the preset threshold, an access request from the requester to the server verifier is locked. It should be understood that the preset threshold may be a value preset by a system, for example, may be 6, 8, 12, or the like. This embodiment of this application is not limited thereto.

In this embodiment of this application, the requester is locked such that a malicious attack from an attacker can be prevented, and system performance can be improved.

Optionally, in some implementations of the first aspect, the method further includes obtaining, by the verifier, verification information sent by the user, when verifying that the verification information is accurate, returning, by the verifier, a password reset interface to the requester, and obtaining, by the verifier, a new password that is submitted by the requester and that is entered by the user using the password reset interface.

It should be understood that, as described above, in this embodiment of this application, the verifier may return the password reset interface to the requester to enable the user to reset the password, provided that the verification information entered by the user is accurate.

However, in this case, once a client (for example, a mobile phone or a computer) of the user is controlled, the client is lost, or the account is cracked, there is a security risk. For example, after an attacker obtains the account of the user, in a process in which the attacker requests password reset using the client, when the attacker cracks first verification information sent by the verifier, the attacker can reset the password using the verification information, and then can log in to the account. Consequently, there is a relatively severe security problem.

Therefore, in view of this problem, in an embodiment of this application, to improve security performance, a process of performing verification for a plurality of times may be set.

Optionally, in some implementations of the first aspect, the verification information is first verification information, and when the account is the valid account, the method further includes obtaining, by the verifier, the first verification information sent by the user, and when the verifier verifies that the first verification information is accurate, sending, by the verifier, third confirmation information to the requester, where the third confirmation information is used to enable the requester to display, to the user, fifth binding information associated with the account, and request the user to determine whether to send second verification information to a third communication address associated with the account, and the fifth binding information is information that corresponds to the account and that is known by the user.

Optionally, in some implementations of the first aspect, the method further includes obtaining, by the verifier, a message that is sent by the requester and that indicates that the user determines to send the second verification information, and sending, by the verifier, the second verification information to the third communication address, and sending a third response message to the requester, where the third response message is used to prompt the user that the verifier has sent the second verification information to the third communication address.

Optionally, in some implementations of the first aspect, the method further includes obtaining, by the verifier, the second verification information sent by the user, when verifying that the second verification information is accurate, returning, by the verifier, a password reset interface to the requester, and obtaining, by the verifier, a new password that is submitted by the requester and that is entered by the user using the password reset interface.

Therefore, in this embodiment of this application, an attack from an attacker can be prevented in a process of performing two or more times of verification such that password reset security is improved.

Therefore, in this embodiment of this application, an attack from an attacker can be prevented in a process of performing two or more times of verification such that password reset security is improved.

Optionally, in some implementations of the first aspect, all of the first binding information, the second binding information, and third binding information are anonymous information.

For example, if binding information is an email address, the requester may display the binding information according to the following anonymization rule a mailbox verifier, the first two characters of a mailbox name, and the last two characters of the mailbox name are retained, and the rest are replaced by asterisks. Alternatively, if binding information is a mobile phone number, the requester may display the binding information according to the following anonymization rule the first three characters and the last four characters are retained, and the rest are replaced by asterisks.

It should be understood that, in this embodiment of this application, the binding information may be alternatively displayed anonymously. This embodiment of this application is not limited thereto. For example, when the binding information is a name of the user, only the user's last name may be displayed, and the user's first name is replaced by an asterisk. For example, if the binding information is "Zhangsan", the requester may display "the binding information associated with the account is Zhang*" to the user. This embodiment of this application is not limited thereto.

In this embodiment of this application, the anonymous information is displayed such that an attacker can be prevented from stealing by entering a valid account, personal data corresponding to the account, and user privacy security can be protected.

Optionally, in some implementations of the first aspect, in addition to being used to enable the requester to display, to the user, the first binding information associated with the account, and request the user to determine whether to send the verification information to the first communication address associated with the account, the first confirmation information is further used to enable the requester to display, to the user, the third binding information associated with the account, and the third binding information is information that corresponds to the account and that is known by the user, and in addition to being used to enable the requester to display, to the user, the second binding information associated with the account, and request the user to determine whether to send the verification information to the second communication address, the second confirmation information is further used to enable the requester to display, to the user, fourth binding information corresponding to the account, and the fourth binding information is information that is generated by the verifier and that has a same form as the third binding information.

Therefore, in this embodiment of this application, a plurality of pieces of binding information are displayed such that a quantity of information collisions caused by anonymous display can be reduced, and user experience can be improved.

According to a second aspect, a password reset method is provided. It should be understood that, the method that is on a requester side and that is described in the second aspect corresponds to the method that is on a verifier side and that is described in the first aspect. For the method on the requester side, refer to the description on the verifier side. To avoid repetition, detailed descriptions are appropriately omitted herein.

Further, the password reset method is applied to a system including a requester and a verifier, the requester needs to access the verifier using an account and a password, and the method includes sending, by the requester to the verifier, an account for requesting password reset, and when the verifier determines that the account is a valid account, receiving, by the requester, first confirmation information sent by the verifier, where the first confirmation information is used to enable the requester to display, to a user, first binding information associated with the account, and request the user to determine whether to send verification information to a first communication address associated with the account, and the first binding information is information that corresponds to the account and that is known by the user, or when the verifier determines that the account is an invalid account, receiving, by the requester, second confirmation information that is sent by the verifier and that has a same form as the first confirmation information, where the second confirmation information is used to enable the requester to display the second binding information to the user, and request the user to determine whether to send verification information to a second communication address corresponding to the account, the second binding information is information that is generated by the verifier based on the account and that corresponds to the account, and the second binding information and the first binding information have a same form.

Therefore, in this application, corresponding fake confirmation information (namely, the second confirmation information) whose form is consistent with that of the first confirmation information is generated for the invalid account. Because the form of the fake confirmation information needs to be consistent with a form of confirmation information corresponding to a real account, a hacker cannot determine validity of the entered account using the confirmation information. Therefore, in this embodiment of this application, a problem that the hacker enumerates valid accounts using prompt information "invalid account" returned by a server can be resolved, and system security performance can be improved.

In addition, in this application, information known by the user or preset information is used as confirmation information. For the hacker, when the hacker does not know whether the account is valid, the hacker cannot know confirmation information corresponding to the account either. Therefore, when the server returns confirmation information, the hacker cannot identify whether the confirmation information is authentic. However, for a common user, if an incorrect account is entered, the common user may identify, using known information or preset information (namely, the foregoing first binding information), that returned information does not belong to the common user (the information is confirmation information for another user, or is fake confirmation information). Therefore, in this embodiment of this application, a problem that the user cannot perceive, in a timely manner, whether "an invalid account is entered" or "an account of another user is mistakenly entered" can also be resolved, and user experience can be improved.

Optionally, in some implementations of the second aspect, the first binding information is the first communication address, and the second binding information is the second communication address.

Optionally, in some implementations of the second aspect, the method further includes sending, by the requester to the verifier, a message that indicates that the user determines to send the verification information, and when the account is the valid account, obtaining, by the requester, a first response message sent by the verifier, where the first response message is used to prompt the user that the verifier has sent the verification information to the first communication address, and the first response message is sent after the verifier sends the verification information to the first communication address, or when the account is the invalid account, obtaining, by the requester, a second response message that is sent by the verifier and that has a same form as the first response message, where the second response message is used to prompt the user that the verifier has sent the verification information to the second communication address, and the second response message is directly sent after the verifier obtains the message that indicates that the user determines to send the verification information.

Optionally, in some implementations of the second aspect, in addition to being used to enable the requester to display, to the user, the first binding information associated with the account, and request the user to determine whether to send the verification information to the first communication address associated with the account, the first confirmation information is further used to enable the requester to display, to the user, the third binding information associated with the account, and the third binding information is information that corresponds to the account and that is known by the user, and in addition to being used to enable the requester to display, to the user, the second binding information associated with the account, and request the user to determine whether to send the verification information to the second communication address, the second confirmation information is further used to enable the requester to display, to the user, fourth binding information that corresponds to the account and that has a same form as the first binding information, and the fourth binding information is information that is generated by the verifier and that has a same form as the third binding information.

Optionally, in some implementations of the second aspect, the first communication address and the second communication address are anonymous information, the first confirmation information is used to enable the requester to request the user to determine whether to send the verification information to the first communication address associated with the account, and enable the requester to request the user to enter an anonymous part of the first communication address, and the second confirmation information is used to enable the requester to request the user to determine whether to send the verification information to the second communication address associated with the account, and enable the requester to request the user to enter an anonymous part of the second communication address.

Optionally, in some implementations of the second aspect, the method further includes sending, by the requester to the verifier, a message that indicates that the user determines to send the verification information, where the message that indicates that the user determines to send the verification information carries the anonymous part entered by the user, and receiving, by the requester, a fourth response message sent by the verifier, where the fourth response message is sent by the verifier when the account is the valid account and the anonymous part entered by the user is correct and after the verifier sends the verification information to the first communication address, and the fourth response message is used to enable the requester to prompt the user that the verifier has sent the verification information to the first communication address, or receiving, by the requester, a fifth response message that is directly sent by the verifier and that has a same form as the fourth response message, where the fifth response message is sent by the verifier when the account is the invalid account or the anonymous part entered by the user is incorrect, and the fifth response message is used to enable the requester to prompt the user that the verifier has sent the verification information to the second communication address.

Optionally, in some implementations of the second aspect, the method further includes sending, by the requester to the verifier, a message that indicates that the user determines to send the verification information, where the message that indicates that the user determines to send the verification information carries the anonymous part entered by the user, receiving, by the requester, a sixth confirmation message sent by the verifier, where the sixth confirmation message is sent by the verifier when the account is the valid account and the anonymous part entered by the user is correct, the sixth confirmation message is used to enable the requester to request the user to confirm sixth binding information associated with the account, and the sixth binding information is information that corresponds to the account and that is known by the user, sending, by the requester to the verifier, a message that indicates that the user confirms the sixth binding information, and receiving, by the requester, a sixth response message sent by the verifier, where the sixth response message is sent after the verifier sends the verification information to the first communication address, and the sixth response message is used to enable the requester to prompt the user that the verifier has sent the verification information to the first communication address, or the method further includes sending, by the requester to the verifier, a message that indicates that the user determines to send the verification information, where the message that indicates that the user determines to send the verification information carries the anonymous part entered by the user, receiving, by the requester, a seventh confirmation message sent by the verifier, where the seventh confirmation message is sent by the verifier when the account is the invalid account or the anonymous part entered by the user is incorrect, the seventh confirmation message is used to enable the requester to request the user to confirm seventh binding information associated with the account, the seventh binding information and the sixth binding information have a same form, and the seventh binding information is generated by the verifier based on the anonymous part entered by the user and/or the account, sending, by the requester to the verifier, a message that indicates that the user confirms the seventh binding information, and receiving, by the requester, a seventh response message that is directly sent by the verifier and that has a same form as the sixth response message, where the seventh response message is used to enable the requester to prompt the user that the verifier has sent the verification information to the second communication address.

Optionally, in some implementations of the second aspect, the method further includes obtaining, by the requester, a password reset interface sent by the verifier, where the password reset interface is sent after the verifier verifies that verification information sent by the user is accurate, and submitting, by the requester to the verifier, a new password entered by the user using the password reset interface.

Optionally, in some implementations of the second aspect, the verification information is first verification information, and when the account is the valid account, the method further includes receiving, by the requester, third confirmation information sent by the verifier, where the third confirmation information is used to enable the requester to display, to the user, fifth binding information associated with the account, and request the user to determine whether to send second verification information to a third communication address associated with the account, the fifth binding information is information that corresponds to the account and that is known by the user, and the third confirmation information is sent after the verifier obtains the first verification information sent by the user.

Optionally, in some implementations of the second aspect, the method further includes sending, by the requester to the verifier, a message that indicates that the user determines to send the second verification information, and receiving, by the requester, a third response message sent by the verifier, where the third response message is used to prompt the user that the verifier has sent the second verification information to the third communication address, and the third response message is sent after the verifier sends the second verification information to the third communication address.

Optionally, in some implementations of the second aspect, the method further includes obtaining, by the requester, a password reset interface sent by the verifier, where the password reset interface is sent after the verifier verifies that the second verification information sent by the user is accurate, and submitting, by the requester to the verifier, a new password entered by the user using the password reset interface.

Optionally, in some implementations of the second aspect, all of the first binding information, the second binding information, and the third binding information are anonymous information.

Optionally, in some implementations of the second aspect, the password includes a PIN, a key, a private key, or a character string specified by the user, and the account includes an email address, a mobile phone number, an account of a third-party application, or a character string registered by the user with the verifier.

According to a third aspect, a verifier is provided, and the verifier includes all modules or units that are configured to perform the method in any one of the first aspect or the possible implementations of the first aspect.

According to a fourth aspect, a requester is provided, and the requester includes all modules or units that are configured to perform the method in any one of the second aspect or the possible implementations of the second aspect.

According to a fifth aspect, a verifier is provided, and includes a transceiver, a processor, and a memory. The processor is configured to control the transceiver to receive or send a signal, the memory is configured to store a computer program, and the processor is configured to invoke the computer program from the memory and run the computer program such that the verifier device performs the method in the first aspect and the possible implementations of the first aspect.

According to a sixth aspect, a requester is provided, and includes a transceiver, a processor, a display, and a memory. The processor is configured to control the transceiver to receive or send a signal, and control the display to display information, the memory is configured to store a computer program, and the processor is configured to invoke the computer program from the memory and run the computer program such that the requester performs the method in the second aspect and the possible implementations of the second aspect.

According to a seventh aspect, a computer-readable medium is provided, and the computer-readable medium stores a computer program. When the computer program is executed by a computer, the method in any one of the first aspect or the possible implementations of the first aspect is implemented.

According to an eighth aspect, a computer-readable medium is provided, and the computer-readable medium stores a computer program. When the computer program is executed by a computer, the method in any one of the second aspect or the possible implementations of the second aspect is implemented.

According to a ninth aspect, a computer program product is provided. When the computer program product is executed by a computer, the method in any one of the first aspect or the possible implementations of the first aspect is implemented.

According to a tenth aspect, a computer program product is provided. When the computer program product is executed by a computer, the method in any one of the second aspect or the possible implementations of the second aspect is implemented.

DESCRIPTION OF EMBODIMENTS

The following describes technical solutions in this application with reference to accompanying drawings.

It should be understood that embodiments of this application are mainly applied to a system including a requester and a verifier, and the requester needs to request, using an account and a password, the verifier to verify an identity. After it is verified that the identity is valid, the requester can access a server.

It should be understood that the verifier in the embodiments of this application may be the server. That is, the verifier and the server are a same device. In this case, the server verifies the requester, and after the server verifies that the identity of the requester is valid, the requester can access the server. Optionally, the verifier may alternatively be a third-party device. That is, the verifier and the server are two independent devices. In this case, the verifier performs only verification, and only after the verifier verifies that the identity of the requester is valid, the requester can access the server.

It should be understood that the requester in the embodiments of this application may also be referred to as a client. The client may include an electronic device that can request the verifier to perform verification, for example, a mobile phone, a tablet computer, a personal digital assistant (PDA), a notebook computer, a smart television, a desktop computer, a point-of-sale (POS) vehicle-mounted device, or a wearable device. The embodiments of this application are not limited thereto. In the embodiments of this application, the requester and the server may form a master-slave architecture. A structural mode of the requester and the server may include a client/server (C/S) mode, a browser/server (B/S) mode, or the like. The embodiments of this application are not limited thereto.

Optionally, in the embodiments of this application, the server may be another client. In this case, communication between the requester and the server is evolved into peer-to-peer (P2P) communication. The embodiments of this application are not limited thereto.

Figure 1:
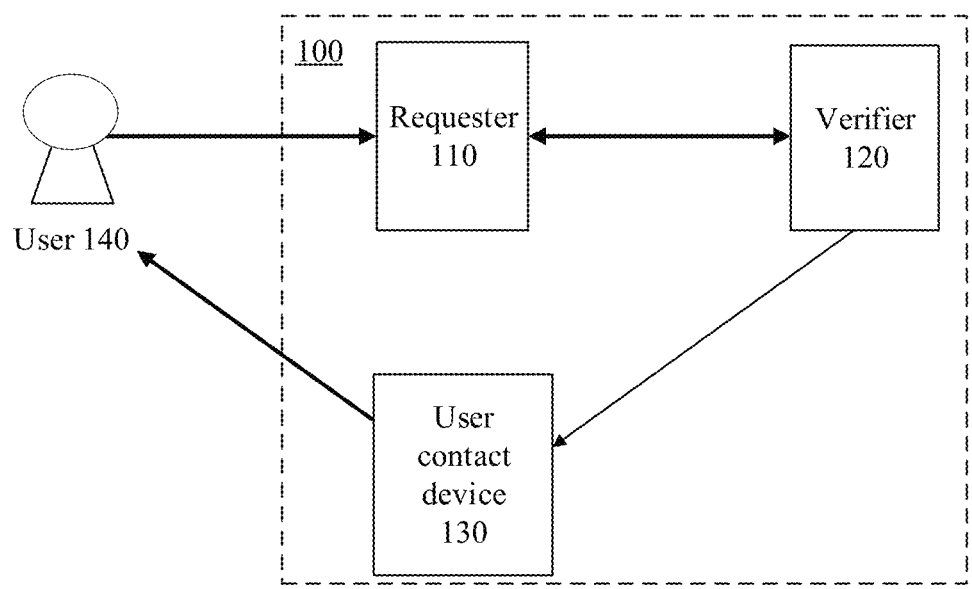
FIG. 1 is a schematic diagram of a system architecture to which an embodiment of this application is applicable.

FIG. 1 is a schematic diagram of a system architecture to which an embodiment of this application is applicable.

A system 100 shown in FIG. 1 includes a requester 110 and a verifier 120. Optionally, the system 100 may further include a user contact device 130. A user 140 shown in FIG. 1 is responsible for triggering a password reset request, entering an account, identifying confirmation information, entering double verification information, obtaining verification information from the user contact device, and the like in a requester interface.

It should be understood that the requester 110 may be an application client installed on a device or an apparatus, or may be a hardware device, and the verifier 120 may be a server, or may be a device specially used by a third party for verification. Specific forms for implementing functions of the requester and the verifier are not limited in this embodiment of this application.

In this embodiment of this application, a function of each component in the system 100 is described as follows.

The requester is responsible for providing an operation interface for the user, transmitting a user input to the verifier, and displaying related response message returned by the verifier.

The verifier is responsible for processing a password reset request of the user, verifying validity of an account, obtaining confirmation information for a valid account, generating fake confirmation information for an invalid account, anonymizing confirmation information related to personal data, returning corresponding response message to a client, and sending verification code information to the user contact device.

The user contact device is responsible for receiving verification information sent by the verifier, and providing the verification information for the user.

It should be understood that, in this embodiment of this application, the user contact device and the requester may be a same device, or the user contact device may be another device, for example, another client device. This embodiment of this application is not limited thereto.

Further, the user may request, at the requester using an account and a password through a communication channel, the verifier to perform verification. After the verification succeeds, the requester can log in to a server, and then access a service provided on the server. When the user forgets the password, the verifier may provide a password reset function for the user such that the user can resume accessing the server.

If a password reset mechanism has a defect, it may be utilized by an attacker as a vulnerability of an entire application program. Even if a hacker fails in brute-force cracking on the original password of the user, the hacker may successfully reset the password for the account by utilizing the vulnerability of the password reset mechanism.

In view of this, the embodiments of this application provide a password reset mechanism, to reduce a password reset vulnerability quantity or avoid a password reset vulnerability while ensuring user experience, and prevent a hacker from cracking a login password for an account by utilizing a vulnerability of the password reset mechanism.

To make the solutions in the embodiments of this application more understandable, before the embodiments of this application are described, two password reset methods are first described below with reference to FIG. 2 and FIG. 3.

Figure 2:
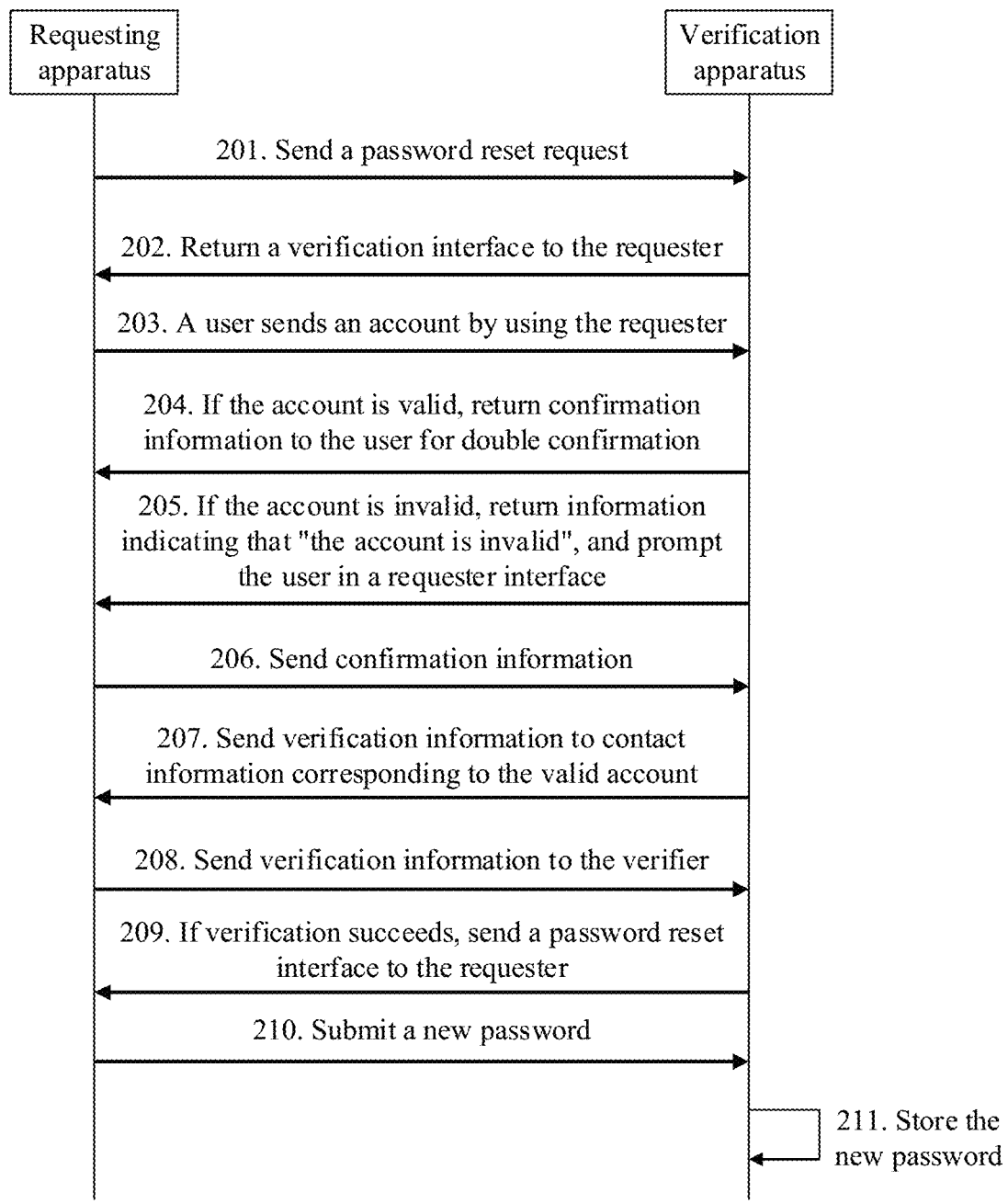
FIG. 2 is a schematic flowchart of a password reset method according to an embodiment of this application.

FIG. 2 shows a password reset method according to an embodiment of this application. Further, the method shown in FIG. 2 includes the following steps.

Step 201. A user sends a password reset request to a verifier by using a requester.

Step 202. The verifier processes the password reset request, and returns a verification interface to the requester.

Step 203. The user enters an account in the requester verification interface and sends the account to the verifier for verification.

Step 204. The verifier verifies the account, and if the account is valid, returns, to the requester for double confirmation by the user, information (or preset information) that corresponds to the account and that is known by the user. Then, step 206 is performed.

Step 205. If the account is invalid, the verifier returns information "invalid account", and prompts the user in a requester interface.

Step 206. The user performs double confirmation by using the information returned to the requester. If the user confirms that the foregoing information known by the user belongs to the user or is accurate, the user sends confirmation information to the verifier by using the requester. If the user confirms that the foregoing information known by the user does not belong to the user or is inaccurate, the user returns to 201 to re-initiate a password reset request.

Step 207. After receiving the confirmation information, the verifier sends verification information (for example, a verification code or a link containing a verification token) to contact information (for example, an email address or a mobile phone number) associated with the account.

Step 208. The user obtains verification information from a device (namely, a user contact device such as a mailbox client or a mobile phone terminal) corresponding to the contact information, and sends the verification information to the verifier by using the requester for double verification.

Step 209. The verifier verifies the verification information sent by the requester, and if the verification succeeds, sends a password reset interface to the requester, or if the verification fails, ends a password reset process.

Step 210. The user sets a new password in the requester password reset interface and submits the new password to the verifier.

Step 211. The verifier stores the account and the corresponding new password, to perform authentication on permission of the user to access the verifier.

In the password reset process in the method shown in FIG. 2, if the account (or the contact information corresponding to the account) entered by the user on the requester interface is invalid, the verifier returns information about "invalidity", and prompts the user on the requester interface. To avoid interference to another user that is caused when the verifier sends verification information to the other user because the user mistakenly enters an account (or a contact method corresponding to the account) of the other user, after validity verification performed by the verifier on the account succeeds, the verifier returns, to the user for double confirmation by the user, the information (or the preset information) that corresponds to the account and that is known by the user. Only after double confirming the known information (or the preset information), the user sends the verification information to the contact information corresponding to the account.

In the password reset method shown in FIG. 2, when the user enters an invalid account, the user can obtain a prompt on the requester interface in a timely manner. When the user enters a valid account that does not belong to the user, the user can perform determining and confirmation in a timely manner using the returned information known by the user or the preset information. This avoids a case in which the user needs to log in to the contact information device to confirm whether the account is correctly entered, and avoids causing interference to another user. Therefore, user experience and perception are relatively good. However, in the method shown in FIG. 2, an "account enumeration" vulnerability exists. To be specific, a hacker enumerates valid accounts using prompt information "invalid account" returned by the verifier.

Consequently, the hacker may use a large quantity of enumerated accounts to perform brute-force cracking. Therefore, a relatively severe security risk exists in the method shown in FIG. 2.

Figure 3:
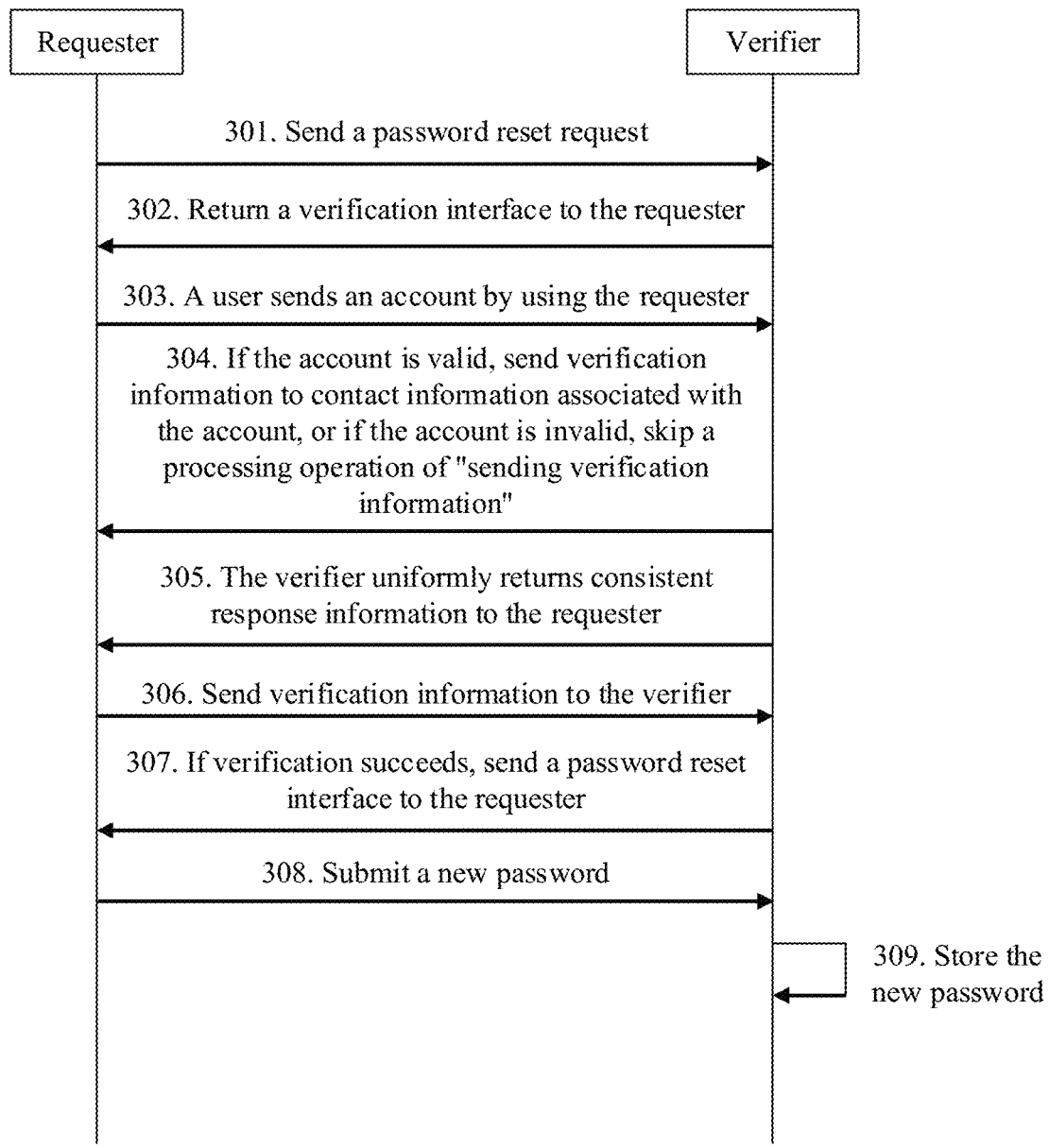
FIG. 3 is a schematic flowchart of a password reset method according to another embodiment of this application.

FIG. 3 shows a password reset method according to an embodiment of this application. Further, the method shown in FIG. 3 includes the following steps.

Step 301. A user sends a password reset request to a verifier by using a requester.

Step 302. The verifier processes the password reset request, and returns a requester verification interface to the user.

Step 303. The user enters an account in the requester verification interface and sends the account to the verifier for verification.

Step 304. The verifier verifies the account, and if the account is valid, sends verification information (for example, a verification code or a link containing a verification token) to contact information (for example, an email address or a mobile phone number) associated with the account, or if the account is invalid, skips a processing operation of "sending verification information".

Step 305. The verifier uniformly returns consistent response message to the requester, for example, "a password reset link including the verification information has been sent to an email address of a contact device associated with the account".

That is, regardless of whether the account is valid, the verifier returns response message with consistent content and a consistent form to the requester.

Step 306. The user obtains verification information from a device (a mailbox verifier or a mobile phone terminal) corresponding to the contact information, and sends the verification information to the verifier by using the requester for double verification.

Step 307. The verifier verifies the verification information sent by the user, and if the verification succeeds, returns a password reset interface to the requester of the user, or if the verification fails, ends a password reset process.

Step 308. The user sets a new password in the requester password reset interface and submits the new password to the verifier.

Step 309. The verifier stores the account and the corresponding new password, to perform authentication on permission of the user to access the verifier.

In the password reset method shown in FIG. 3, because the verifier returns consistent response message for a "valid account" and an "invalid account", a hacker cannot determine, using the response message, whether the entered account is valid. However, the common user also cannot determine whether the account entered by the common user belongs to the common user, resulting in poor user experience and perception. For example, when the user enters an incorrect account, the user cannot perceive this mistake in the interface in a timely manner, and needs to wait for arrival of the verification information on the device (namely, a user contact device, for example, logging in to a mailbox or checking a mobile phone) corresponding to the contact information. The user may need to wait for a period of time to confirm whether there is an information delay or an incorrect account is entered.

In addition, when the user mistakenly enters another account, because the user cannot perceive and prevent this mistake in a timely manner, a background server sends verification information to contact information corresponding to the other account, resulting in interference to another user. For example, the other user may mistakenly consider that account information of the user is maliciously leaked or account information of the user is attacked by a hacker, and become panicky.

Therefore, in the password reset method shown in FIG. 2, if response message that can be used by the user to determine "account validity" is returned, an "account enumeration" vulnerability exists. In the password reset method shown in FIG. 3, security is achieved at the cost of user experience of the user in a password reset process. Consequently, in the password reset method shown in FIG. 3, a main reason why the user cannot perceive, in a timely manner, whether "an invalid account is entered" or "an account of another user is mistakenly entered" is that the server does not return any response message that can be used for determining by the user.

In view of the foregoing problems, an embodiment of this application skillfully provides a password reset method, to resolve a problem that "a user cannot determine whether an account belongs to the user" in the method in FIG. 3. In addition, in this embodiment of this application, in a process in which the user determines "whether an account belongs to the user", a problem that "a hacker can easily determine, using a form of response message returned by a server, whether an entered account is valid" in the method in FIG. 2 can be resolved.

That is, according to the password reset method in this embodiment of this application, a contradiction between security and friendliness (user experience) in a password reset process can be resolved. In the password reset process, an attacker cannot determine validity of an account using response message returned by a server, but a common user can determine whether an entered account belongs to the common user.

Further, in this embodiment of this application, after the server determines the validity of the account, if the account is valid, the server returns confirmation information associated with the account to a client for confirmation by the user, or if the account is invalid, the server also returns fake confirmation information to the client for confirmation by the user.

When a hacker does not know whether the account is valid, the hacker does not know confirmation information corresponding to the valid account or the invalid account either. Therefore, for the confirmation information returned by the server, the hacker cannot determine whether the confirmation information is real confirmation information from the valid account or fake confirmation information from the invalid account. Therefore, an "account enumeration" problem in FIG. 2 is resolved in this embodiment of this application. In addition, because the confirmation information is information known by the user or information preset by the user, the common user can identify, using the returned confirmation information, whether the confirmation information is related to the common user. If the user determines that the confirmation information is not related to the user, it indicates that the entered account is incorrect or an account of another user is mistakenly entered. Therefore, a problem that "a user cannot determine whether confirmation information is related to the user" in FIG. 3 is also resolved in this embodiment of this application.

Figure 4:
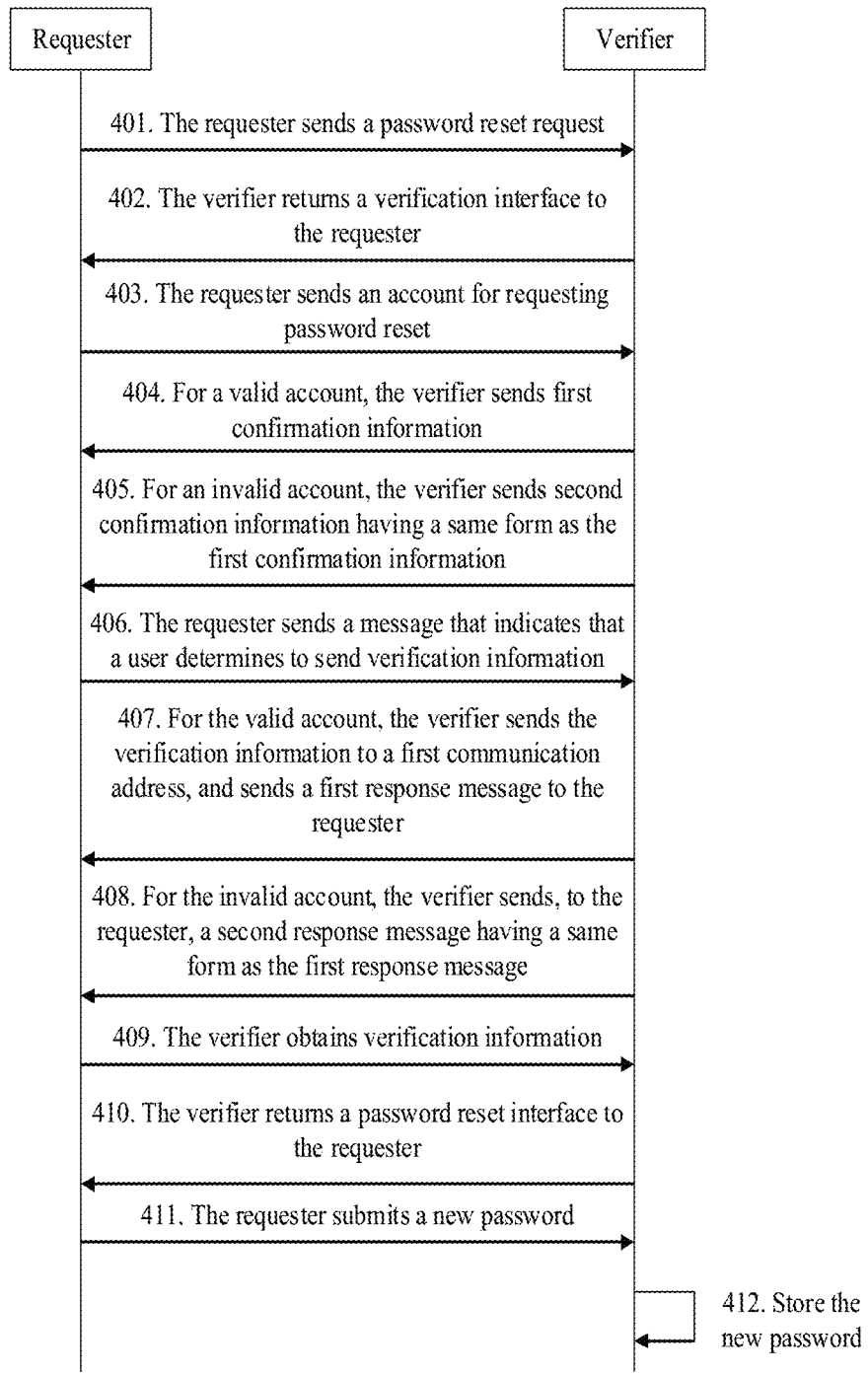
FIG. 4 is a schematic flowchart of a password reset method according to another embodiment of this application.

The following describes a password reset method in an embodiment of this application in detail with reference to FIG. 4.

It should be understood that the method shown in FIG. 4 may be applied to the system architecture shown in FIG. 1. Further, the method 400 shown in FIG. 4 includes the following steps.

Step 401. A requester sends a password reset request.

Further, a user sends the password reset request to a verifier using a "forgot password" link in a requester interface.

Figure 5:
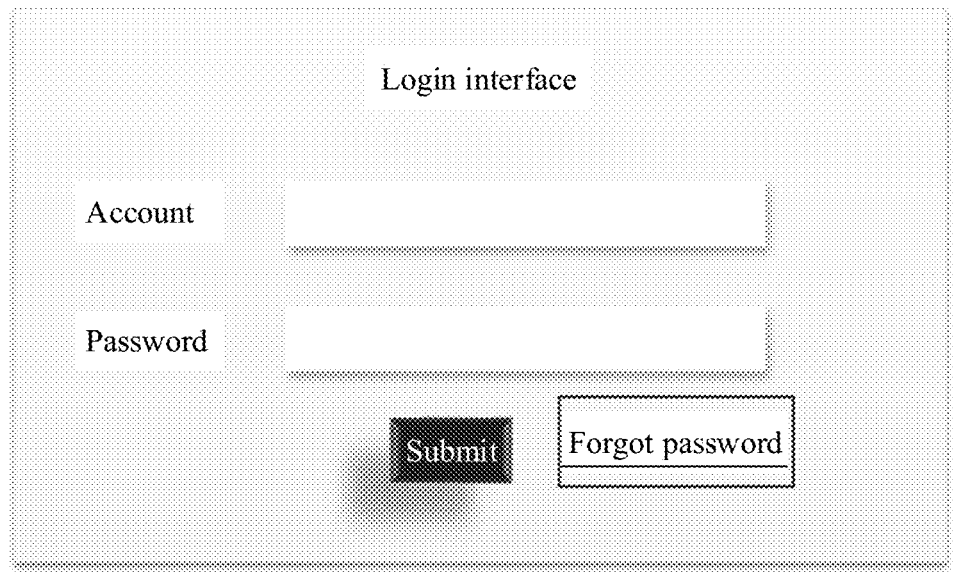
FIG. 5 is a schematic diagram of an interface displayed by a requester in a password reset process according to an embodiment of this application.

For example, as shown in FIG. 5, when the user logs in to an account in a login interface displayed by the requester, if the user forgets a password, the user may send the password reset request to the verifier using the "forgot password" link.

It should be understood that FIG. 5 is merely an example. "Forgot password" in FIG. 5 may trigger a password reset function. After the user clicks/taps "forgot password", the requester may send the password reset request to the verifier. The "forgot password" herein may also be replaced by "retrieve password", "reset password", or the like. This embodiment of this application is not limited thereto.

It should be understood that the account in this embodiment of this application may include an email address, a mobile phone number, an account of a third-party application, a character string registered by the user with the verifier, or a biometric feature such as a facial feature or a fingerprint of the user. This embodiment of this application is not limited thereto.

It should be understood that, in this embodiment of this application, the password of the account may include a PIN, a key, a private key, a character string specified by the user, or a biometric feature such as a facial feature or a fingerprint of the user. This embodiment of this application is not limited thereto.

It should be understood that, in this embodiment of this application, a communications protocol between the requester and the verifier may be a communications protocol such as the Hypertext Transfer Protocol (HTTP) over Secure Socket Layer (SSL) (HTTPS), the Secure File Transfer Protocol (SFTP), the Transmission Control Protocol (TCP), or the User Datagram Protocol (UDP). This embodiment of this application is not limited thereto.

Step 402. The verifier returns a verification interface to the requester.

Further, the verifier processes the password reset request, and returns, to the requester, the verification interface for entering the account.

Figure 6:
FIG. 6 is a schematic diagram of an interface displayed by a requester in a password reset process according to another embodiment of this application.

For example, as shown in FIG. 6, after obtaining the password reset request sent by the requester, the verifier returns a "please enter an account" interface to a client.

For example, the verifier may add, to a returned message, a parameter used to carry an entered account. After the user enters the account, the verifier may obtain the entered account from the parameter.

Step 403. The requester sends the account for requesting password reset.

For example, the requester sends, to the verifier, the account entered by the user for requesting password reset.

Correspondingly, the verifier receives the account that is sent by the requester and that is entered by the user for requesting password reset.

That is, the user enters the account in the requester verification interface and sends the account to the verifier for verification.

Figure 7:
FIG. 7 is a schematic diagram of an interface displayed by a requester in a password reset process according to another embodiment of this application.

For example, as shown in FIG. 7, the account entered by the user is "IOTSecurity". When entering the account, the user may send the account to the verifier by clicking/tapping a "submit" button.

Step 402 and step 403 show a case in which the user directly enters and submits the account.

Alternatively, in another embodiment, in FIG. 6 in step 402, when returning the "please enter an account" interface to the client after obtaining the password reset request sent by the requester, the verifier may further display "enter a verification code" using the client. The verification code may be randomly generated by the verifier. This embodiment of this application is not limited thereto.

Correspondingly, in FIG. 7 in step 403, after entering the account and a verification code, the user sends the account and the verification code to the verifier using the "submit" button.

In this embodiment of this application, an option of entering the verification code by the user is added such that a machine can be prevented from ceaselessly and maliciously sending an account that requires password reset, and system security can be improved.

Step 404. For a valid account, the verifier sends first confirmation information.

Further, when the account is the valid account, the verifier sends the first confirmation information to the requester, the first confirmation information is used to enable the requester to display, to the user, first binding information associated with the account, and request the user to determine whether to send verification information to a first communication address associated with the account, and the first binding information is information that corresponds to the account and that is known by the user.

That is, the verifier verifies the account, and if the account is valid, returns the first binding information (or preset information) of the account for double confirmation by the user.

It should be understood that, in this embodiment of this application, the first binding information associated with the account may be any information known by the user.

The user may pre-associate the first binding information with the account. For example, the user may associate the first binding information with the account when registering the account, or the user associates the first binding information with the account in a process of using the account. This embodiment of this application is not limited thereto.

For example, the first binding information may be any information known by the user, for example, a mobile phone number of the user, an email address of the user, a contact address of the user, a name of the user, an employee identifier (ID) of the user, a geographical name, a hometown of the user, a name of a relative of the user, a hobby of the user, or a name of a school of the user. This embodiment of this application is not limited thereto.

For example, the first binding information may be an email address "corenet@huawei.com" or a mobile phone number "13888888888" that is associated with the account and that is known by the user.

After obtaining the first confirmation information, the requester may display the first binding information to the user, and request the user to determine whether to send verification information to the first communication address. For example, content displayed by the requester is "the first binding information is xx, please determine whether to send verification information to a first communication address associated with the account". It should be understood that, in this case, the first binding information may be directly displayed information (that is, a specific address is displayed), but specific address information of the first communication address may not be displayed.

Figure 8:
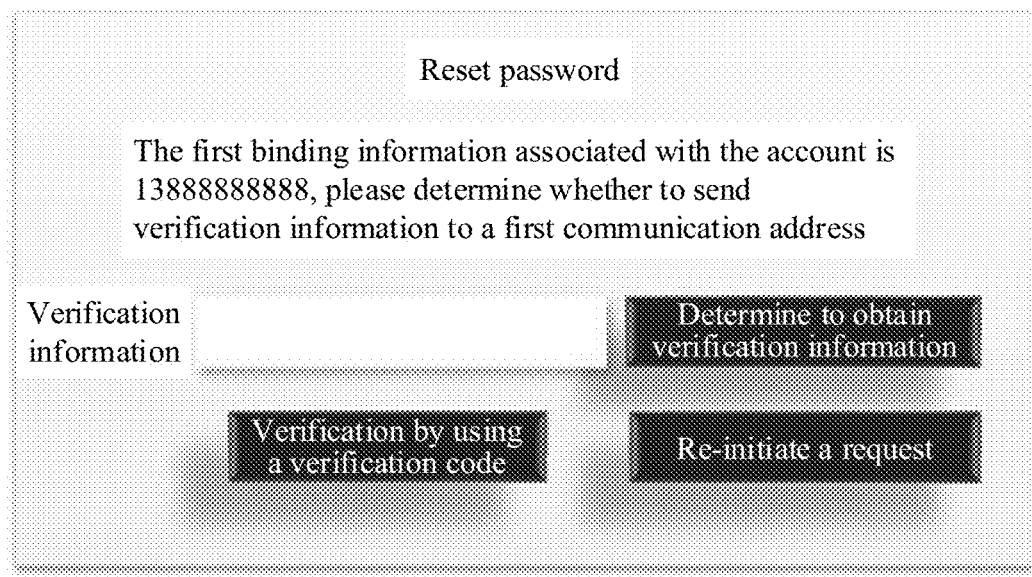
FIG. 8 is a schematic diagram of an interface displayed by a requester in a password reset process according to another embodiment of this application.

For example, as shown in FIG. 8, the first binding information is the mobile phone number 13888888888. After obtaining the first confirmation information sent by the verifier, the requester may display "the first binding information associated with the account is 13888888888, please determine whether to send verification information to a first communication address" to the user.

Optionally, the first binding information may be the first communication address. In this case, the first binding information and the first communication address are same information.

That is, after obtaining the first confirmation information, the requester may request the user to "determine whether to send verification information to a first communication address". The first communication address herein is the foregoing first binding information, and the first communication address is directly displayed information (that is, a specific address is displayed).

Figure 9:
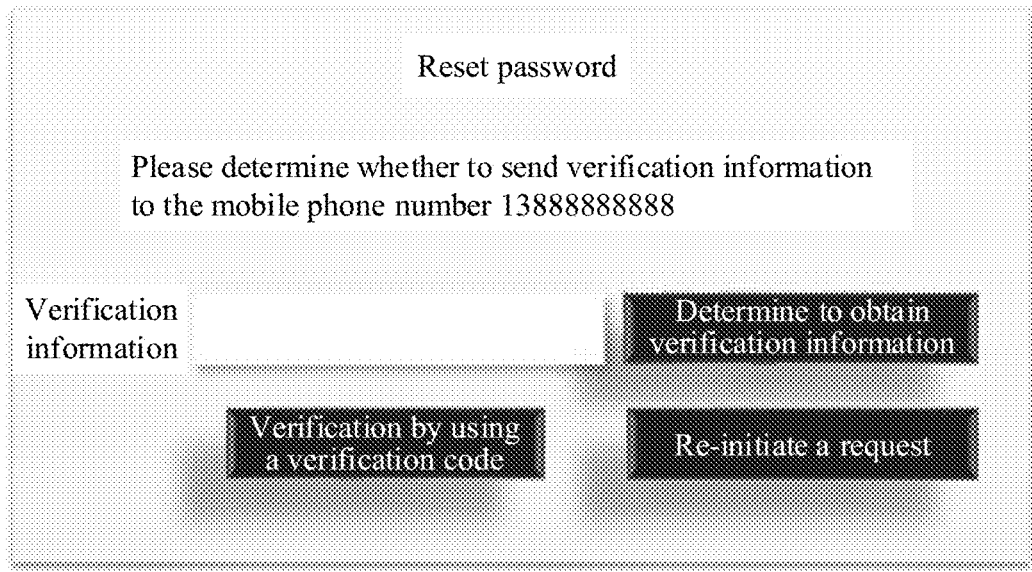
FIG. 9 is a schematic diagram of an interface displayed by a requester in a password reset process according to another embodiment of this application.

For example, when the first binding information is the mobile phone number 13888888888, FIG. 8 may be replaced by FIG. 9. As shown in FIG. 9, the requester displays "please determine whether to send verification information to a mobile phone number 13888888888" to the user. In this case, the mobile phone number is the first binding information, and is also the first communication address.

Figure 10:
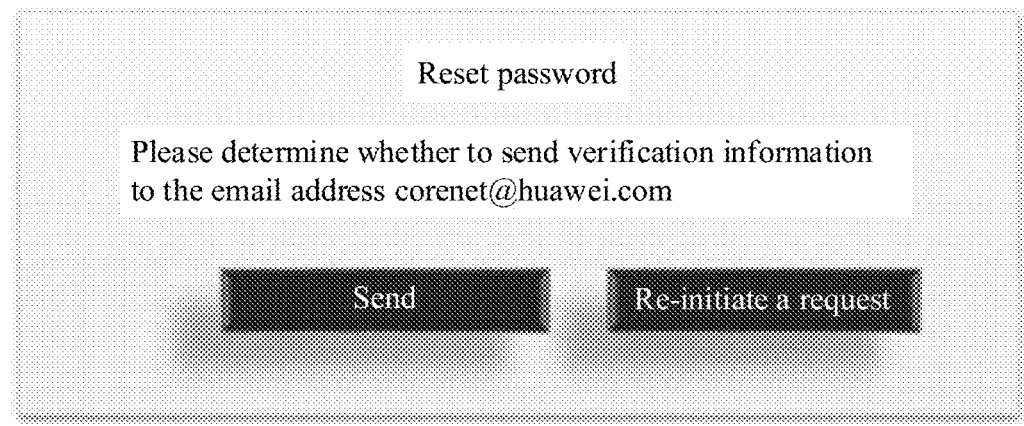
FIG. 10 is a schematic diagram of an interface displayed by a requester in a password reset process according to another embodiment of this application.

For another example, when the first binding information is the email address corenet@huawei.com, as shown in FIG. 10, the requester displays "please determine whether to send verification information to an email address corenet@huawei.com" to the user. In this case, the email address is the first binding information, and is also the first communication address.

It should be understood that, the first confirmation information may include the content displayed by the requester to the user. For example, the first confirmation information is "the first binding information associated with the account is 13888888888, please determine whether to send verification information to a first communication address", or the first confirmation information is "please determine whether to send verification information to an email address corenet@huawei.com". Optionally, the first confirmation information may include only the first binding information. In this case, the requester may display the foregoing content to the user according to a default setting. That is, in this case, after obtaining the first binding information, the requester may display, to the user according to the default setting, the content shown in FIG. 8 to FIG. 10.

It should be understood that, the foregoing describes a case in which the requester displays the first binding information in a plaintext manner in FIG. 8 to FIG. 10. Optionally, in another embodiment, to avoid leakage of personal privacy of the user, the first binding information may be anonymously displayed. That is, the first binding information is anonymous information.

Figure 11:
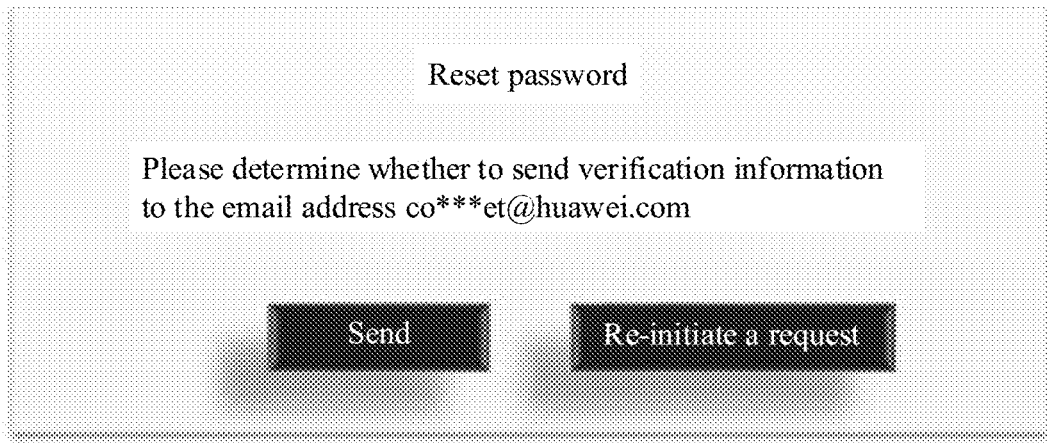
FIG. 11 is a schematic diagram of an interface displayed by a requester in a password reset process according to another embodiment of this application.

For example, as shown in FIG. 11, if the first binding information is an email address, the requester may display the first binding information according to the anonymization rule that is a mailbox verifier, the first two characters of a mailbox name, and the last two characters of the mailbox name are retained, and the rest are replaced by asterisks.

Figure 12:
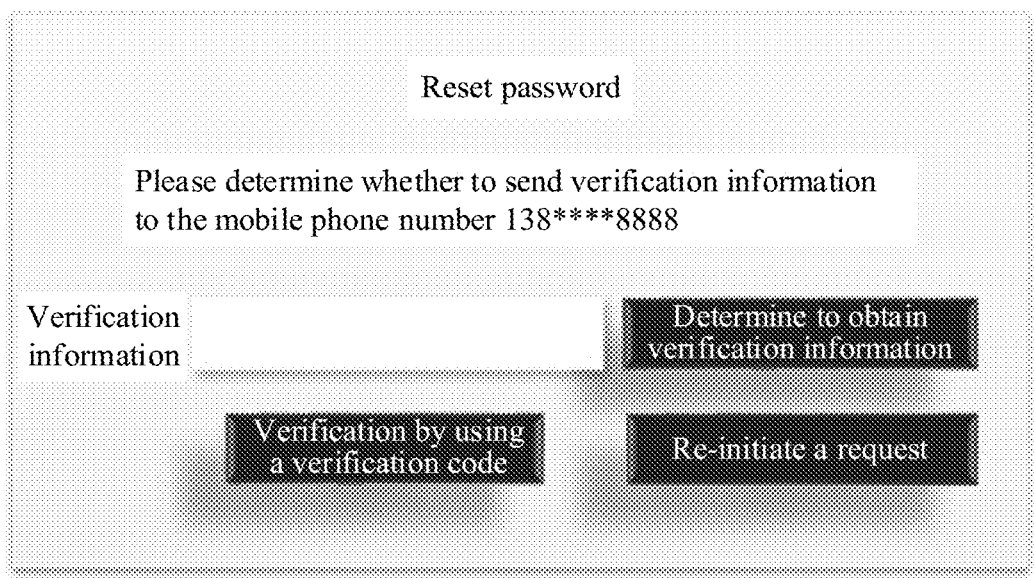
FIG. 12 is a schematic diagram of an interface displayed by a requester in a password reset process according to another embodiment of this application.

Alternatively, as shown in FIG. 12, if the first binding information is a mobile phone number, the requester may display the first binding information according to the anonymization rule that is the first three characters and the last four characters are retained, and the rest are replaced by asterisks.

It should be understood that, in this embodiment of this application, the first binding information may be alternatively displayed anonymously. This embodiment of this application is not limited thereto. For example, when the first binding information is a name of the user, only the user's last name may be displayed, and the user's first name is replaced by an asterisk. For example, if the first binding information is "Zhangsan", the requester may display "the first binding information associated with the account is Zhang*, please determine whether to send verification information to a first communication address" or the like to the user. This embodiment of this application is not limited thereto.

In this embodiment of this application, the anonymous information is displayed such that an attacker can be prevented from leaking, by entering a valid account, personal data corresponding to the account, and user privacy security can be protected.

Step 405. For an invalid account, the verifier sends second confirmation information having a same form as the first confirmation information. It should be noted that, that forms are the same in this application means that composition structures and presentation manners are the same. That is, a composition structure and a presentation manner of the first confirmation information are the same as those of the second confirmation information.

Further, when the account is the invalid account, the verifier generates, based on the account, second binding information corresponding to the account, and sends, to the requester, the second confirmation information having the same form as the first confirmation information, the second confirmation information is used to enable the requester to display the second binding information to the user, and request the user to determine whether to send verification information to a second communication address corresponding to the account, and the second binding information and the first binding information have a same form.

It should be understood that the second communication address may be generated by the verifier based on the invalid account, and the second communication address may be a fake communication address or a meaningless communication address. In actual application, the verifier sends no verification information to the second communication address. The second communication address is in a one-to-one correspondence with the invalid account entered by the user. That is, different invalid accounts correspond to different second communication addresses.

That is, the verifier verifies the account. If the account is invalid, the verifier generates fake confirmation information that corresponds to the invalid account and whose form is consistent with the form of the first confirmation information, and returns the fake confirmation information to a requester interface.

It should be understood that, in this embodiment of this application, when the verifier verifies that the account is valid, the requester displays the first binding information that is associated with the account and that is known by the user. The first binding information is information prestored by the verifier, and does not need to be generated by the verifier. When the verifier verifies that the account is invalid, the verifier generates the second confirmation information that corresponds to the invalid account and whose form is consistent with that of the first confirmation information, and returns the second confirmation information to the requester interface. That is, the verifier generates binding information (the second binding information) only when the account is invalid. If the account is valid, the verifier does not need to generate binding information.

In this application, the corresponding fake confirmation information (namely, the second confirmation information) whose form is consistent with that of the first confirmation information is generated for the invalid account. Because the form of the fake confirmation information needs to be consistent with a form of confirmation information corresponding to a real account, a hacker cannot determine validity of the entered account using the confirmation information. Therefore, in this embodiment of this application, a problem that the hacker enumerates valid accounts using prompt information "invalid account" returned by a server can be resolved, and system security performance can be improved.

In addition, in this application, information known by the user or preset information is used as confirmation information. For the hacker, when the hacker does not know whether the account is valid, the hacker cannot know confirmation information corresponding to the account either. Therefore, when the server returns confirmation information, the hacker cannot identify whether the confirmation information is authentic. However, for a common user, if an incorrect account is entered, the common user may identify, using known information or preset information (namely, the foregoing first binding information), that returned information does not belong to the common user (the information is confirmation information for another user, or is fake confirmation information). Therefore, in this embodiment of this application, a problem that the user cannot perceive, in a timely manner, whether "an invalid account is entered" or "an account of another user is mistakenly entered" can also be resolved, and user experience can be improved.

Optionally, in another embodiment, the verifier may generate, based on the account, the second binding information uniquely corresponding to the account.

For example, the verifier may generate, based on the invalid account using a first function algorithm (for example, a random seed-based generation algorithm, a hash-based generation algorithm, or an iteration-based generation algorithm), the second binding information uniquely corresponding to the invalid account. This embodiment of this application is not limited thereto.

It should be understood that, in this embodiment of this application, the second binding information corresponding to the invalid account may be generated using a plurality of algorithms, provided that only same binding information is generated for a same invalid account entered for a plurality of times. This embodiment of this application is not limited thereto.

Optionally, in another embodiment, similar to the first binding information, the second binding information and the second communication address may also be same information. This embodiment of this application is not limited thereto.

Figure 13:
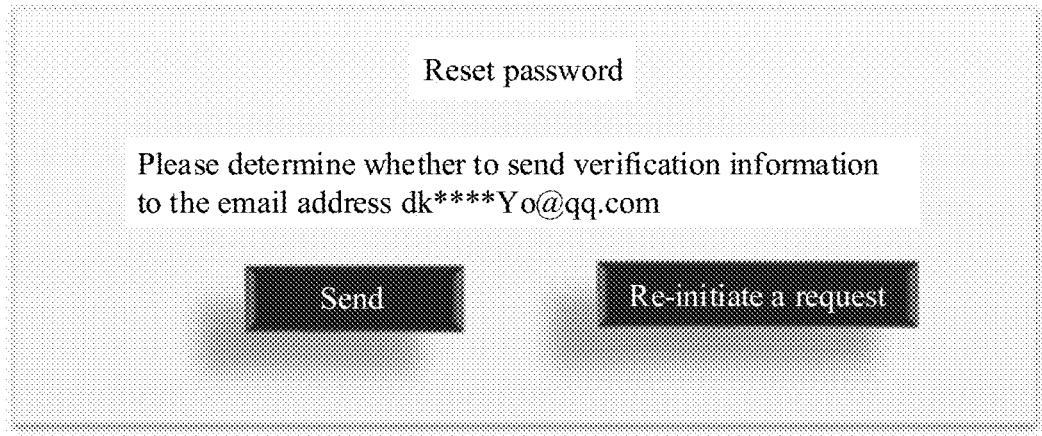
FIG. 13 is a schematic diagram of an interface displayed by a requester in a password reset process according to another embodiment of this application.

For example, the first binding information is the first communication address, and the second binding information is the second communication address. As shown in FIG. 13, if the user enters an invalid account "invalidAccount" in step 403, the verifier generates fake binding information (namely, the second binding information) dk****Yo@qq.com corresponding to the account, and sends the fake binding information to the user for confirmation.

Figure 14:
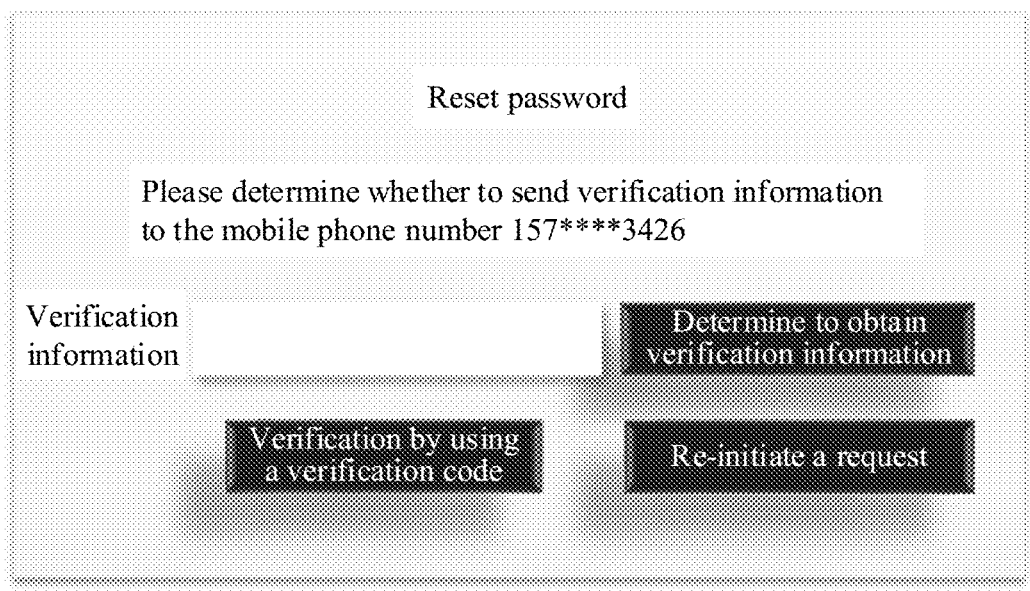
FIG. 14 is a schematic diagram of an interface displayed by a requester in a password reset process according to another embodiment of this application.

For another example, as shown in FIG. 14, if the user enters an invalid account "invalidAccount" in step 403, the verifier generates fake binding information (namely, the second binding information) 157****3426 corresponding to the account, and sends the fake binding information to the user for confirmation.

It should be understood that a form of the second binding information is the same as a form of the first binding information, and a manner of displaying the second binding information by the requester is the same as a manner of displaying the first binding information. For example, corresponding to the manner of displaying the first binding information, the requester may display the second binding information in an anonymous manner or a plaintext manner.

Optionally, in another embodiment, that the verifier generates, based on the account, second binding information corresponding to the account when the account is the invalid account includes generating, by the verifier based on the account and a first key, the second binding information corresponding to the account.

Further, to guard against a malicious internal person (for example, a programmer or an insider) who knows a process of generating fake confirmation information, when the fake confirmation information is generated, a secret (which may also be referred to as a key) such as a key string may be introduced when the second binding information is generated in this embodiment of this application. The verifier stores the secret, and generates the fake confirmation information with participation of the secret. Therefore, the malicious internal person cannot determine a relationship between the fake confirmation information and the invalid account without knowing the secret.

Therefore, in this embodiment of this application, the key is introduced before the fake confirmation information for the invalid account is generated, and the key and the invalid account are used together to generate the fake confirmation information (the second binding information). Therefore, the malicious internal person knowing the process of generating the fake confirmation information cannot determine the relationship between the fake confirmation information and the invalid account without knowing the secret. System security performance can be improved in this embodiment of this application.

Further, in another embodiment, generating, by the verifier based on the account and a first preset key, the second binding information corresponding to the account includes obtaining, by the verifier, the first key, combining, by the verifier, the first key and the account, to generate combined data, and generating, by the verifier, the second binding information based on the combined data using a first function algorithm, where the first function algorithm is used to generate output information uniquely corresponding to one piece of input information.

It should be understood that, in this embodiment of this application, the first function algorithm may be a plurality of types of algorithms such as a random seed-based generation algorithm, a hash-based generation algorithm, or an iteration-based generation algorithm, provided that the first function algorithm can be used to generate uniquely corresponding output information (the second binding information) for a same piece of input information (the combined data). This embodiment of this application is not limited thereto.

For example, if the second binding information is generated using the random seed-based generation algorithm, the verifier may use a spliced string of the invalid account and a key string as a random seed, and then generate the fake confirmation information (the second confirmation information) based on the random seed. The following describes a specific process in which the verifier generates, for the invalid account using the random seed-based generation algorithm, a unique fake anonymous email address shown in FIG. 15 or a unique fake anonymous mobile phone number shown in FIG. 16.

The following describes a method for generating a fake anonymous email address.

For example, it is assumed that a form of a real anonymous email address is that a mailbox verifier, the first two characters of a mailbox name, and the last two characters of the mailbox name are retained, and the rest are represented by asterisks. To keep consistent with an anonymous email address of a valid account in terms of a form, the fake anonymous email address needs to display a mailbox verifier, the first two characters of a mailbox name, and the last two characters of the mailbox name, and the rest are represented by asterisks.

Figure 15:
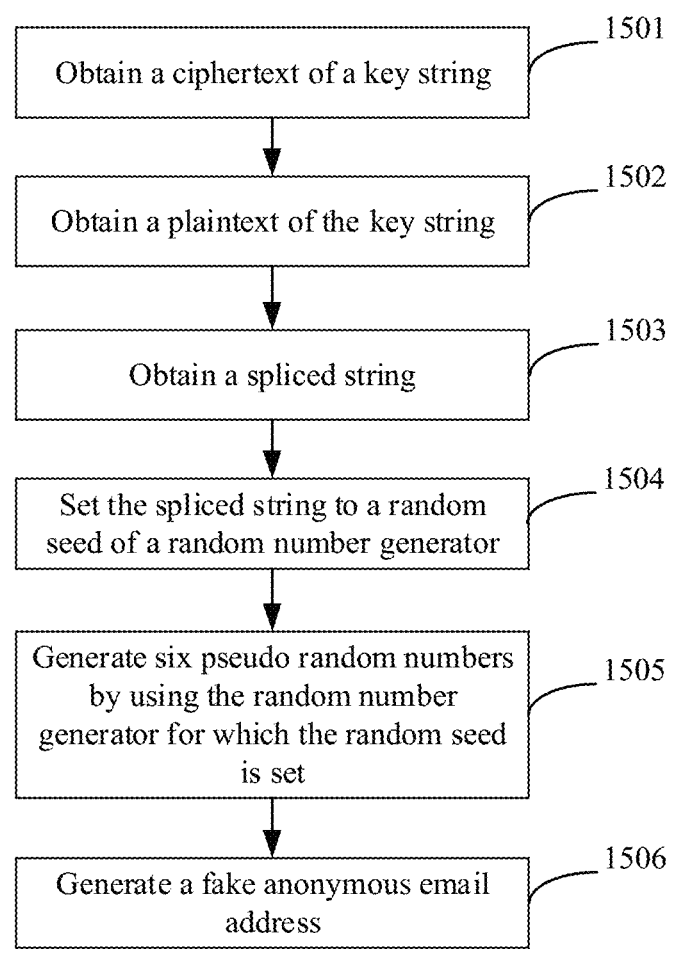
FIG. 15 is a schematic flowchart of a binding information generation method according to an embodiment of this application.

It is assumed that a key string used to generate the fake anonymous email address is "secretString", and is stored in a storage system (a database or a file system) after being encrypted using a verifier key. It is assumed that the invalid account is "invalidAccount". A process of generating the fake anonymous email address is shown in FIG. 15, and may include the following steps.

Step 1501. The verifier obtains a ciphertext of the key string from the storage system (the database or the file system).

Step 1502. The verifier decrypts the key string by using the key, to obtain a plaintext "secretString" of the key string.

Step 1503. The verifier splices the key string "secretString" and the invalid account "invalidAccount" to obtain a spliced string seed=secretStringHinvalidAccount (namely, the foregoing combined data).

Step 1504. The verifier sets the spliced string to a random seed of a random number generator.

Step 1505. The verifier generates six pseudo random numbers an index 1, an index 2, an index 3, an index 4, an index 5, and an index 6 by using the random number generator for which the random seed is set.

The index 1 is used to randomly select a mailbox verifier from a mailbox verifier list as a mailbox verifier of a fake mailbox. For example, the mailbox verifier list is {"@qq.com", "@163.com", "@hotmail.com", "@gmail.com", "@sina.com"}.

The index 2, the index 3, the index 4, and the index 5 are used to select random characters from a character list as a first character, a second character, a last character, and a penultimate character of a fake mailbox name respectively. For example, an optional character list is:
 {0123456789abcdefghijklmnopqrstuvwxyz-
  ABCDEFGHIJKLMNOPQRSTUVWXYZ}.

The index 6 is used to randomly select a quantity of displayed asterisks "*". It is assumed that the quantity of asterisks can be randomly selected from an integer list {3, 4, 5, 6, 7}.

It should be understood that, in this embodiment of this application, if spliced string seeds used as random seeds are the same, a same group of random numbers: an index 1, an index 2, an index 3, an index 4, an index 5, and an index 6 are generated each time, to ensure a correspondence between the invalid account and the fake anonymous email address.

Step 1506. The verifier obtains characters at corresponding locations based on the random numbers: the index 1, the index 2, the index 3, the index 4, the index 5, and the index 6, splices the characters into a character string according to an anonymous email address display rule, and uses the character string as the fake anonymous email address for the invalid account.

If the user enters the invalid account "invalidAccount" in step 403, the verifier generates one-to-one corresponding fake confirmation information "dk****Yo@qq.com", and sends the fake confirmation information to the user for confirmation.

The following describes a method for generating a fake anonymous mobile phone number.

For example, it is assumed that a form of a real anonymous mobile phone number is that the first three characters and the last four characters are retained, and the rest are replaced by asterisks. To keep consistent with an anonymous mobile phone number of a valid account in terms of a form, the fake anonymous mobile phone number needs to display the first three characters and the last four characters of the mobile phone number, and the rest are represented by asterisks.

Figure 16:
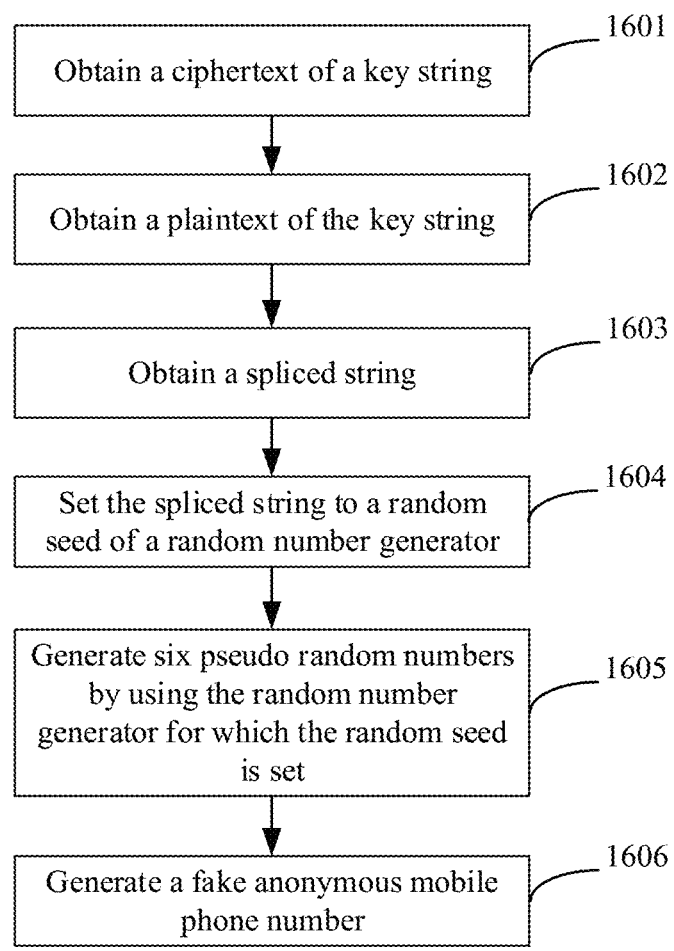
FIG. 16 is a schematic flowchart of a binding information generation method according to another embodiment of this application.

It is assumed that a key string used to generate the fake anonymous mobile phone number is "secretString", and is stored in a storage system (a database or a file system) after being encrypted using a verifier key. It is assumed that the invalid account is "invalidAccount". A process of generating the fake anonymous mobile phone number is shown in FIG. 16, and may include the following steps.

Step 1601. The verifier obtains a ciphertext of the key string from the storage system (the database or the file system).

Step 1602. The verifier decrypts the key string using the key, to obtain a plaintext "secretString" of the key string.

Step 1603. The verifier splices the key string "secretString" and the invalid account "invalidAccount" to obtain a spliced string seed=secretStringHinvalidAccount (namely, the foregoing combined data).

Step 1604. The verifier sets the spliced string seed to a random seed of a random number generator.

Step 1605. The verifier generates six pseudo random numbers: an index 1, an index 2, an index 3, an index 4, an index 5, and an index 6 by using the random number generator for which the random seed is set.

The index 1, the index 2, the index 3, the index 4, the index 5, and the index 6 are used to select random characters from a character list {0123456789} as the second character, the third character, the last character, the penultimate character, the antepenultimate character, and the last but three character of the fake anonymous mobile phone number respectively.

It should be understood that, in this embodiment of this application, if spliced string seeds used as random seeds are the same, a same group of random numbers: an index 1, an index 2, an index 3, an index 4, an index 5, and an index 6 are generated each time, to ensure a correspondence between the invalid account and the fake anonymous mobile phone number.

Step 1606. The verifier obtains characters at corresponding locations based on the random numbers: the index 1, the index 2, the index 3, the index 4, the index 5, and the index 6. The first character of the mobile phone number is 1 by default, and a character at another location is replaced by an asterisk "*". Finally, characters at all locations are spliced into a character string, and the character string is used as the fake anonymous mobile phone number for the invalid account.

If the user enters the invalid account "invalidAccount" in step 403, the verifier generates one-to-one corresponding fake confirmation information "157****3426", and sends the fake confirmation information to the user for confirmation.

It should be understood that the foregoing describes that the combined data is in a form of the string obtained by splicing the invalid account and the key. Optionally, the combined data may be in a form of any combination of the invalid account and the key. This embodiment of this application is not limited thereto.

The foregoing describes a process of generating the second binding information using the random seed-based generation algorithm. Optionally, in this embodiment of this application, the second binding information may be alternatively generated using another algorithm such as the hash-based generation algorithm or the iteration algorithm, provided that these algorithms can be used to generate uniquely corresponding output information (namely, the second binding information whose form is consistent with that of the first binding information) for a same piece of input information (the combined data). This embodiment of this application is not limited thereto.

It should be noted that, in this embodiment of this application, the first binding information and the second binding information may be anonymously displayed in step 404 and step 405. However, in this case, a collision of information known by the user is caused.

For example, when a mobile phone number bound to a first account is 13888888888, and a mobile phone number bound to a second account is 13889998888, the two mobile phone numbers are both anonymously displayed as 138**8888. In this case, when the user mistakenly enters the second account as the first account, if the user sees a displayed mobile phone number "138**8888", the user considers that the user enters the first account. Therefore, the user may determine to send verification information using the verifier. In this case, a mobile phone, namely, 13889998888, of another user receives the verification information, but a mobile phone, namely, 13888888888, of the user of the first account receives no verification information. This affects user experience.

Therefore, to avoid the information collision, alternatively, in another embodiment, step 404 may be replaced by the following content.

In addition to being used to enable the requester to display, to the user, the first binding information associated with the account, and request the user to determine whether to send the verification information to the first communication address associated with the account, the first confirmation information is further used to enable the requester to display, to the user, third binding information associated with the account, and the third binding information is information that corresponds to the account and that is known by the user.

It should be understood that the third binding information is also information known by the user, and a definition of the third binding information is similar to that of the first binding information. To avoid repetition, details are not described herein again. It should be noted that, in this embodiment of this application, the first binding information is different from the third binding information.

Figure 17:
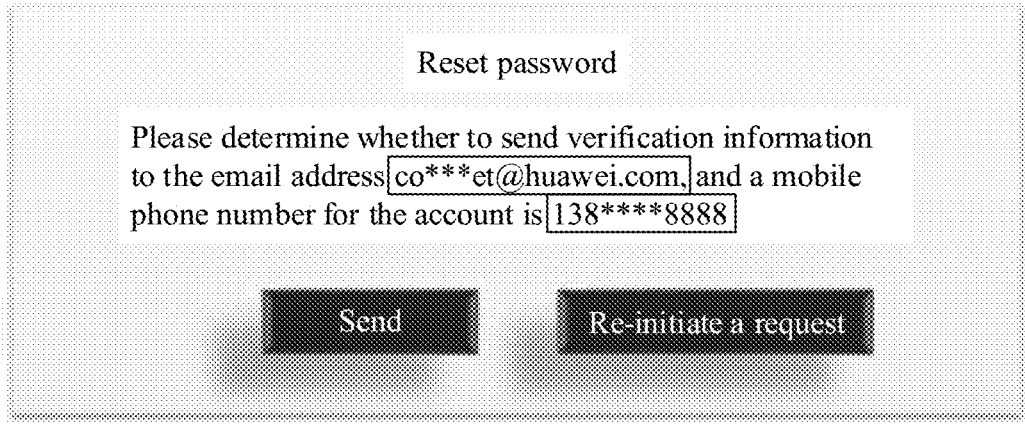
FIG. 17 is a schematic diagram of an interface displayed by a requester in a password reset process according to another embodiment of this application.

For example, as shown in FIG. 17, when the first binding information is an email address co*et@huawei.com, and when the third binding information is a mobile phone number 1388888, after the requester obtains the first confirmation information sent by the verifier, the requester may display "please determine whether to send verification information to an email address co*et@huawei.com, and a mobile phone number for the account is 138****8888" to the user.

Similarly, step 405 may be replaced by the following content.

In addition to being used to enable the requester to display, to the user, the second binding information associated with the account, and request the user to determine whether to send the verification information to the second communication address, the second confirmation information is further used to enable the requester to display, to the user, fourth binding information corresponding to the account, and the fourth binding information is information that is generated by the verifier and that has a same form as the third binding information.

It should be understood that the fourth binding information is another piece of information that is generated by the verifier and that corresponds to the account. Further, a definition and a generation method of the fourth binding information are similar to those of the second binding information. To avoid repetition, details are not described herein again.

Similarly, when the account is invalid, a plurality of pieces of fake confirmation information need to be generated for the invalid account. It should be noted that, in this embodiment of this application, the second binding information is different from the fourth binding information.

Figure 18:
FIG. 18 is a schematic diagram of an interface displayed by a requester in a password reset process according to another embodiment of this application.

For example, as shown in FIG. 18, when the second binding information is an email address dk**Yo@qq.com, and the forth binding information is a mobile phone number 1573426, after the requester obtains the second confirmation information sent by the verifier, the requester may display "please determine whether to send verification information to an email address dkYo@qq.com, and a mobile phone number for the account is 157**3426" to the user.

It should be understood that the foregoing describes a case in which the requester anonymously displays two pieces of binding information simultaneously. Optionally, in this embodiment of this application, three or more pieces of binding information may be simultaneously displayed. This embodiment of this application is not limited thereto.

Therefore, in this embodiment of this application, a plurality of pieces of binding information are displayed such that a quantity of information collisions caused by anonymous display can be reduced, and user experience can be improved.

Step 406. The requester sends a message that indicates that the user determines to send the verification information.

Further, the requester sends, to the verifier, the message that indicates that the user determines to send the verification information, and correspondingly, the verifier obtains the message that is sent by the requester and that indicates that the user determines to send the verification information.

Figure 19:
FIG. 19 is a schematic diagram of an interface displayed by a requester in a password reset process according to another embodiment of this application.
Figure 20:
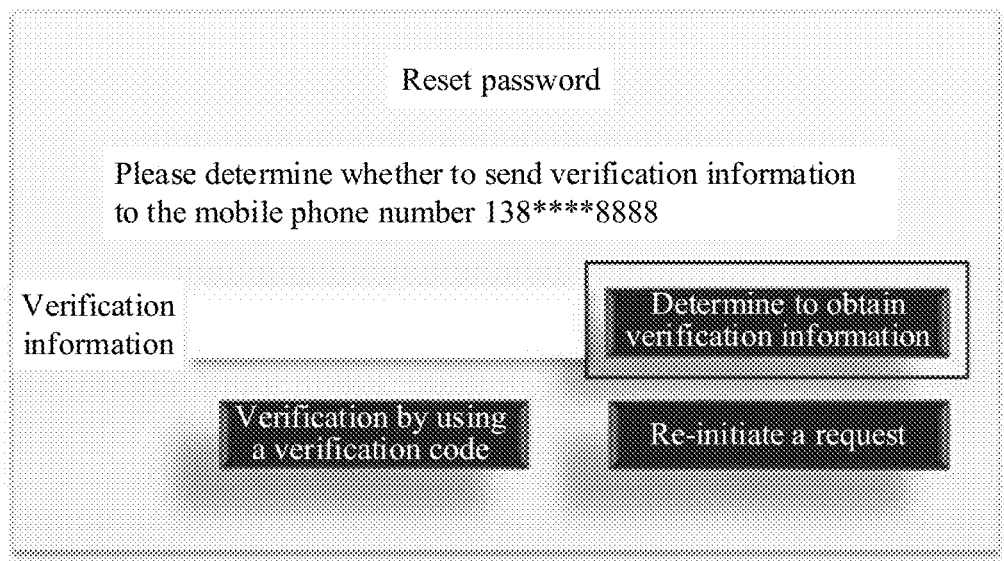
FIG. 20 is a schematic diagram of an interface displayed by a requester in a password reset process according to another embodiment of this application.

For example, the user performs double confirmation using returned information. As shown in FIG. 19 or FIG. 20, if the user confirms, based on binding information, that the account is an account belonging to the user, the user sends confirmation information to the verifier. If the user confirms that the account is not an account belonging to the user, the user returns to step 401 to re-initiate a password reset request.

It should be understood that, in this embodiment of this application, the user may return to 401 in a plurality of manners, to re-initiate the password reset request. For example, the user may resend the password reset request by re-accessing the "forgot password" link, using a back button of a browser, or using a "button" specially used to trigger the password reset request. This embodiment of this application is not limited thereto.

Step 407. For the valid account, the verifier sends the verification information to the first communication address, and sends a first response message to the requester.

Further, the verifier obtains the message that is sent by the requester and that indicates that the user determines to send the verification information. When the account is the valid account, the verifier sends the verification information to the first communication address, and sends the first response message to the requester, and the first response message is used to prompt the user that the verifier has sent the verification information to the first communication address.

That is, after the verifier receives the confirmation information, if the account is valid, the verifier sends verification information (for example, a verification code or a link containing a verification token) to contact information (namely, the first communication address) (for example, an email address or a mobile phone number) associated with the account, and sends, to the requester interface of the user, a message (namely, the first response message) about sending the verification information.

Figure 21:
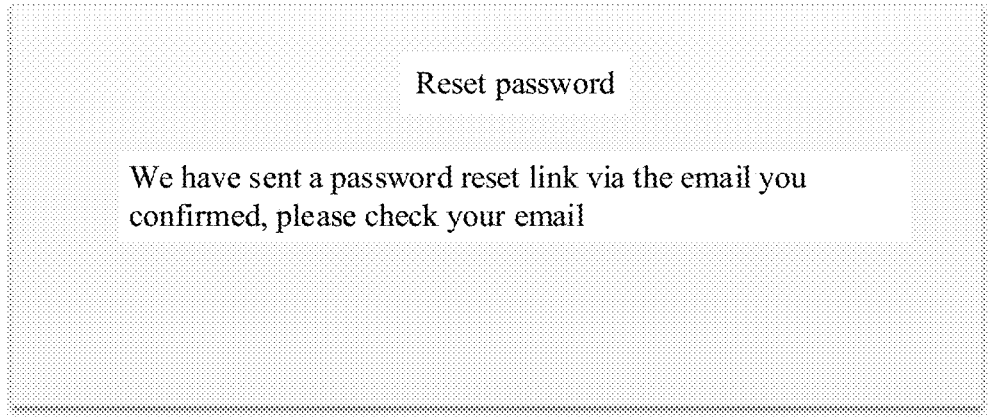
FIG. 21 is a schematic diagram of an interface displayed by a requester in a password reset process according to another embodiment of this application.

For example, as shown in FIG. 21, for a mailbox device, the verifier may send, using a Simple Mail Transfer Protocol (SMTP) mail transfer protocol to an email address associated with the account, a reset link that contains the verification information, and send the first response message to the requester. The first response message is used to prompt the user that "we have sent a password reset link via the email you confirmed, please check your email".

Figure 22:
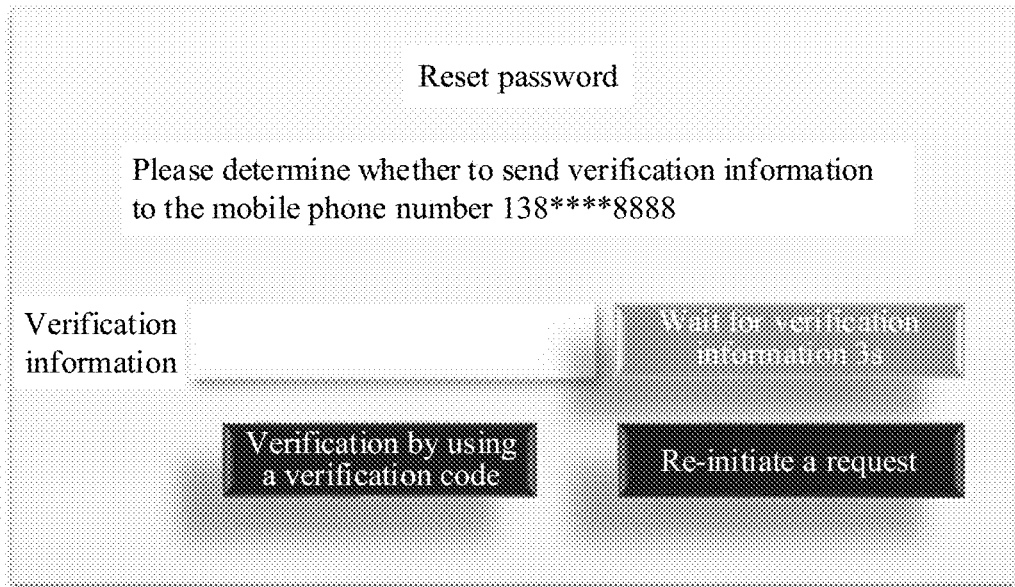
FIG. 22 is a schematic diagram of an interface displayed by a requester in a password reset process according to another embodiment of this application.

As shown in FIG. 22, for a mobile phone number, the verifier may send verification code information to the mobile phone number using an SMS message protocol such as Short Message P2P (SMPP), China Mobile P2P (CMPP), or Short Message Gateway Protocol (SMGP), and send the first response message to the requester. The first response message is used to prompt the user that the verifier has sent the verification information to the first communication address, and display, to the user, an interface of waiting for entering of verification information.

Step 408. For the invalid account, the verifier sends, to the requester, a second response message having a same form as the first response message.

Further, when the account is the invalid account, the verifier directly sends, to the requester, the second response message having the same form as the first response message, and the second response message is used to prompt the user that the verifier has sent the verification information to the second communication address.

That is, if the account is invalid, a response message having a same form as that in step 407 is directly sent to the requester of the user.

Figure 23:
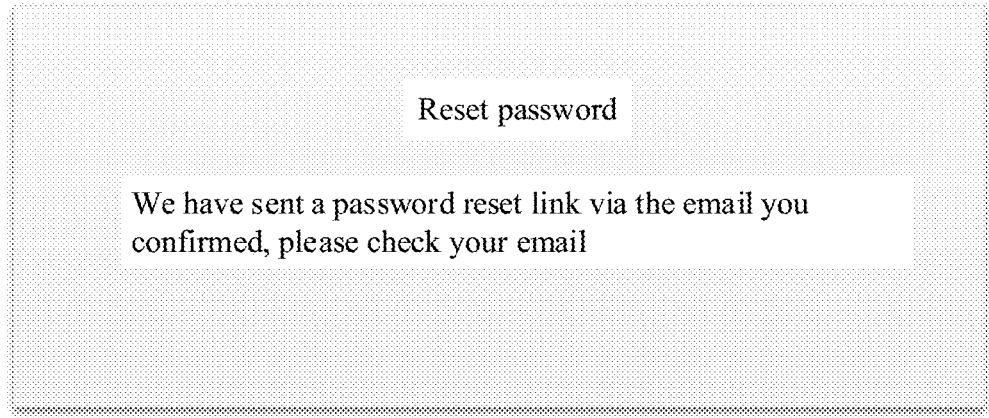
FIG. 23 is a schematic diagram of an interface displayed by a requester in a password reset process according to another embodiment of this application.

For example, as shown in FIG. 23, the verifier directly displays, for the invalid account, a prompt interface of sending the verification information.

Figure 24:
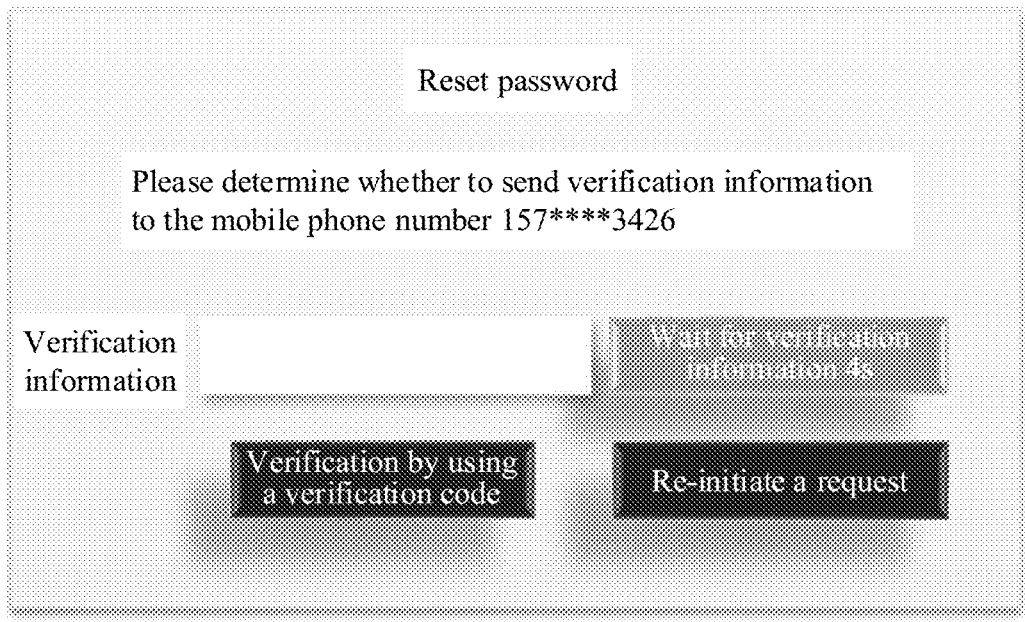
FIG. 24 is a schematic diagram of an interface displayed by a requester in a password reset process according to another embodiment of this application.

As shown in FIG. 24, in a scenario in which a mobile phone number is used for verification, when the account is invalid, the user also sees an interface waiting for arrival of a verification code. That is, the verifier directly displays, for the invalid account, a prompt interface of sending verification information to the mobile phone number.

Therefore, in this application, corresponding fake confirmation information in a consistent form is generated for the invalid account, and regardless of any operation performed by the user in a client interface in which the fake confirmation information is returned, the server returns a response message consistent with that for the valid account. First, a form of the fake confirmation information needs to be consistent with that of confirmation information corresponding to a real account. In this way, a hacker cannot determine validity of the entered account using the confirmation information. In addition, regardless of any operation performed by the user in the client interface in which the fake confirmation information is returned, the server returns the response message consistent with that for the valid account. In this way, the hacker also cannot determine the validity of the entered account using the response message. In conclusion, a problem that a hacker enumerates valid accounts using prompt information "invalid account" returned by a server in the method in FIG. 2 is resolved in this application.

Optionally, in another embodiment, when the account is invalid, regardless of any input performed by the user in an "enter a mobile phone verification code" interface, the verifier may directly return "the entered mobile phone verification code is invalid".

Optionally, when the account is valid, if the user enters incorrect verification information in an "enter a mobile phone verification code" interface, the verifier may also directly return "the entered mobile phone verification code is invalid".

Because the hacker cannot receive an SMS verification code, the hacker does not know whether "the entered mobile phone verification code is invalid" displayed by the requester is a feedback corresponding to an invalid account or a feedback corresponding to an incorrectly entered valid account. Therefore, a password reset vulnerability can be avoided.

Because the invalid account cannot be used to obtain verification information, the invalid account cannot be used to perform a subsequent password reset process. In actual application, an attacker may continuously request password reset for a plurality of invalid accounts. This may cause network congestion, and affect system performance. For this problem, in this embodiment of this application, when the server verifier determines that a quantity of consecutive times for which the user requests password reset for the invalid account using the requester reaches a preset threshold, an access request from the requester to the server verifier is locked. It should be understood that the preset threshold may be a value preset by a system, for example, may be 6, 8, 12, or the like. This embodiment of this application is not limited thereto.

In this embodiment of this application, the requester is locked such that a malicious attack from an attacker can be prevented, and system performance can be improved.

Step 409. The verifier obtains verification information.

Further, the user entering the valid account that belongs to the user may obtain verification information from a device (a mailbox verifier or a mobile phone terminal) corresponding to the contact information, and send the verification information to the verifier for double verification.

For example, for the account IOTSecurity, the user logs in to a mailbox huawei@qq.com, and opens an email. The verification information is sent to the verifier for double verification by clicking/tapping a reset link in the email.

Figure 25:
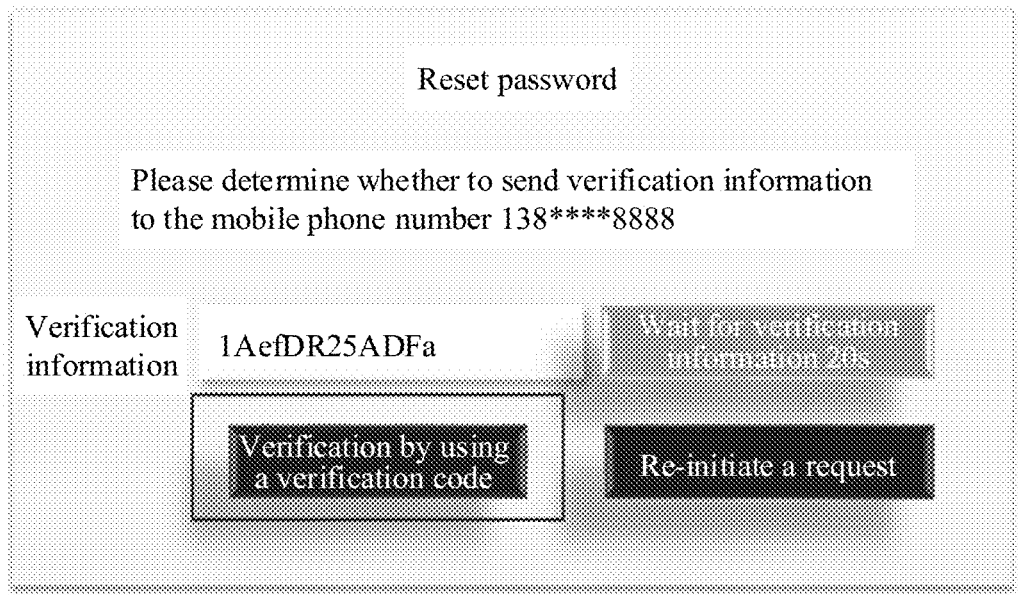
FIG. 25 is a schematic diagram of an interface displayed by a requester in a password reset process according to another embodiment of this application.

Alternatively, for example, as shown in FIG. 25, in a scenario in which a mobile phone number is used for verification, for the account IOTSecurity, the user checks a mobile phone to read a verification code, enters the verification code in an interface, and clicks/taps "verification using a verification code" to send the verification code to the verifier for double verification.

It should be understood that the verification information may be sent by the user to the verifier using the requester. Optionally, the verification information may be alternatively sent by the user to the verifier directly using a user contact device. This embodiment of this application is not limited thereto.

For the user entering the invalid account, because the verifier sends no verification information to contact information of the invalid account, the user cannot receive a password reset link containing verification information or read verification code information from a mobile phone number for a next operation. Therefore, system security can be improved in this embodiment of this application.

It should be understood that, in this embodiment of this application, the verification information is randomly generated by the verifier, and the verification information has security strength against current brute-force cracking.

Step 410. The verifier returns a password reset interface to the requester.

Further, when verifying that the verification information is accurate, the verifier return the password reset interface to the requester.

Figure 26:
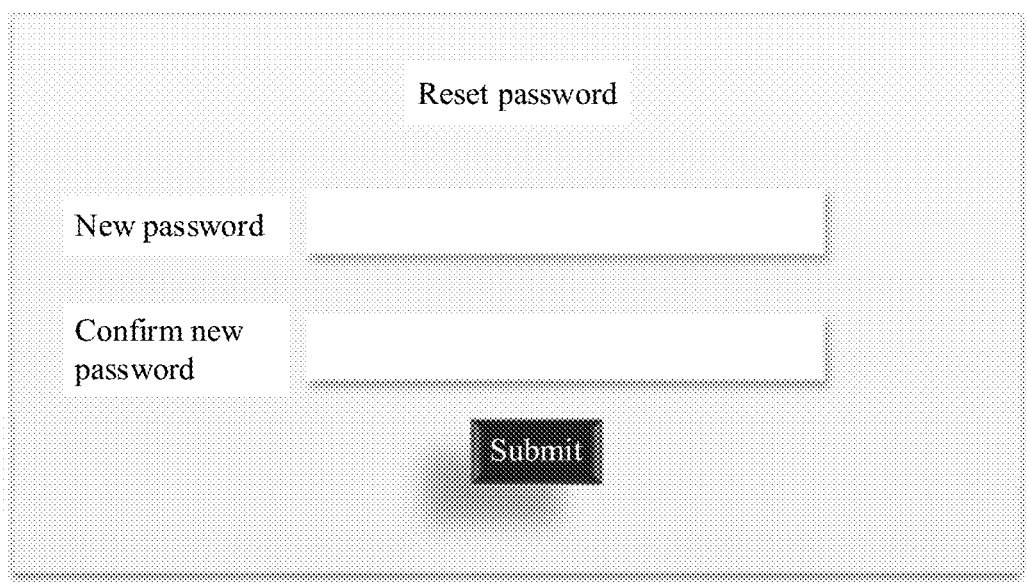
FIG. 26 is a schematic diagram of an interface displayed by a requester in a password reset process according to another embodiment of this application.

For example, as shown in FIG. 26, the verifier verifies the verification information sent by the user, and if the verification succeeds, sends the password reset interface, or if the verification fails, ends a password reset process and deletes the previously generated verification information.

Step 411. The requester submits a new password.

Further, the verifier obtains the new password that is submitted by the requester and that is entered by the user using the password reset interface.

Figure 27:
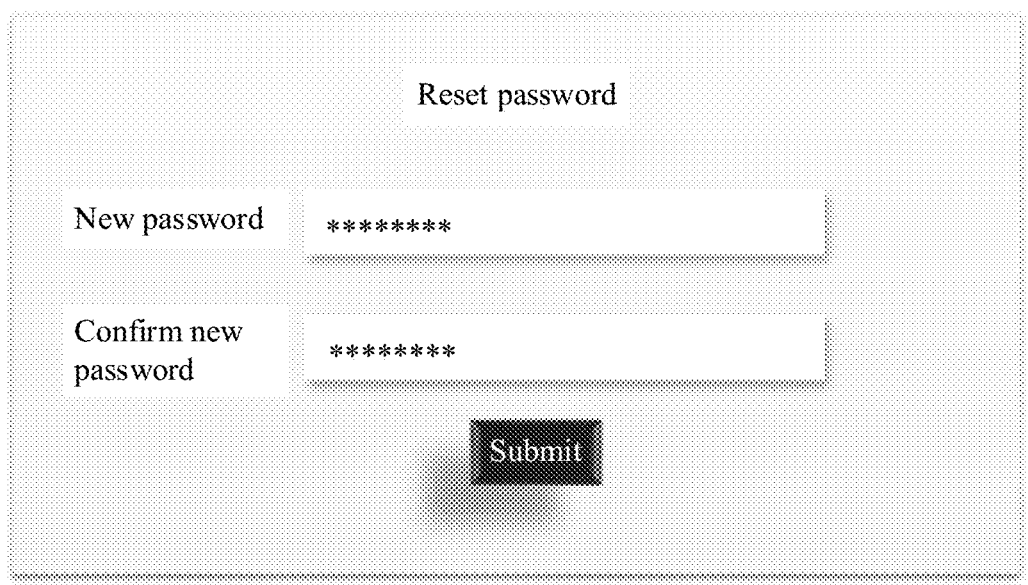
FIG. 27 is a schematic diagram of an interface displayed by a requester in a password reset process according to another embodiment of this application.

For example, as shown in FIG. 27, the user sets the new password in the password reset interface and submits the new password to the verifier.

Step 412. The verifier stores the new password.

Further, the verifier stores the account and the corresponding new password, to perform authentication on permission of the user to access the verifier.

It should be understood that, as described above, in this embodiment of this application, the verifier may return the password reset interface to the requester to enable the user to reset the password, provided that the verification information entered by the user is accurate.

However, in this case, once the client (for example, a mobile phone or a computer) of the user is controlled, the client is lost, or the account is cracked, there is a security risk. For example, after an attacker obtains the account of the user, in a process in which the attacker requests password reset using the client, when the attacker cracks first verification information sent by the verifier, the attacker can reset the password using the verification information, and then can log in to the account. Consequently, there is a relatively severe security problem.

Figure 28A:
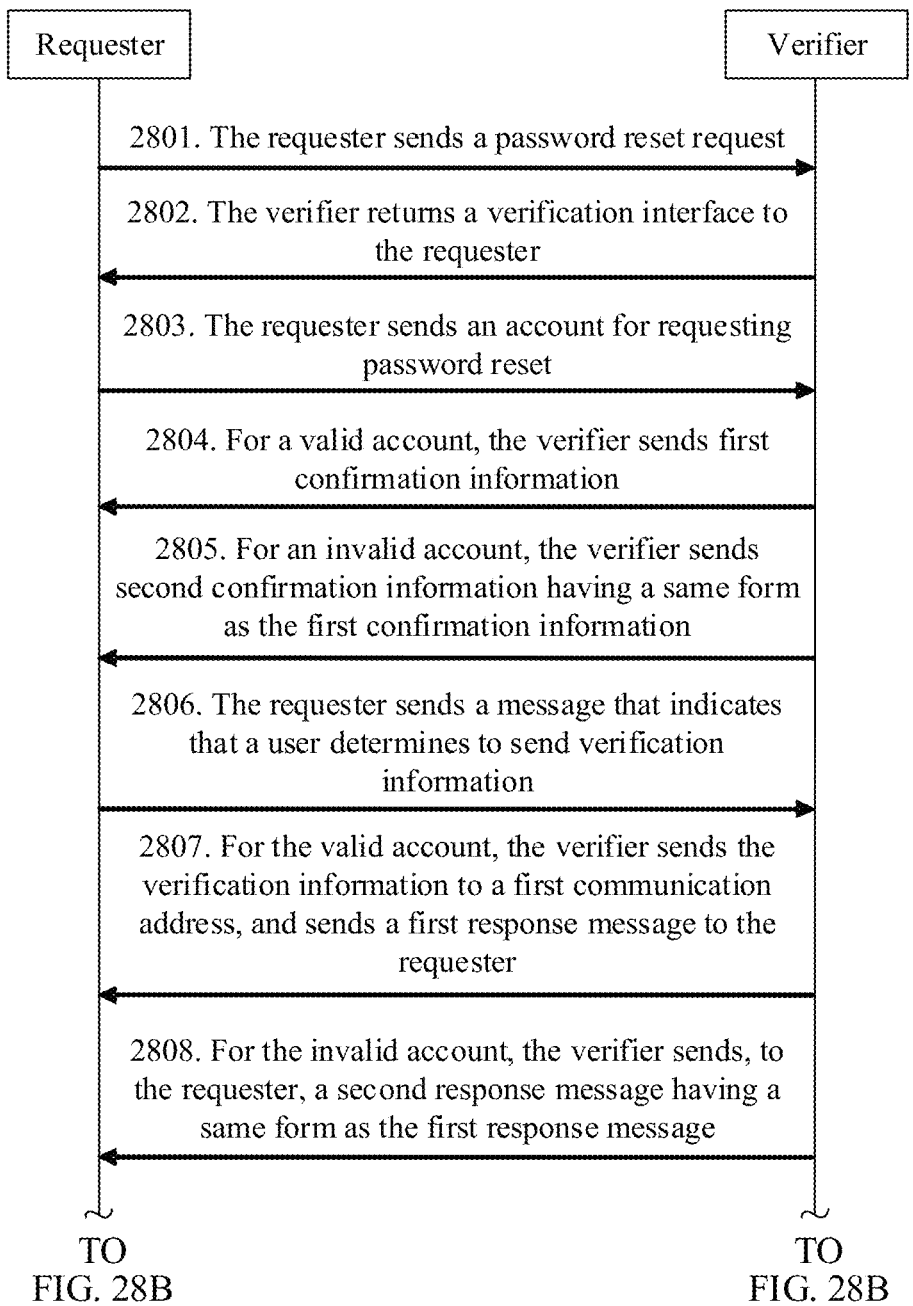
FIG. 28A and FIG. 28B are a schematic flowchart of a password reset method according to another embodiment of this application.
Figure 28B:
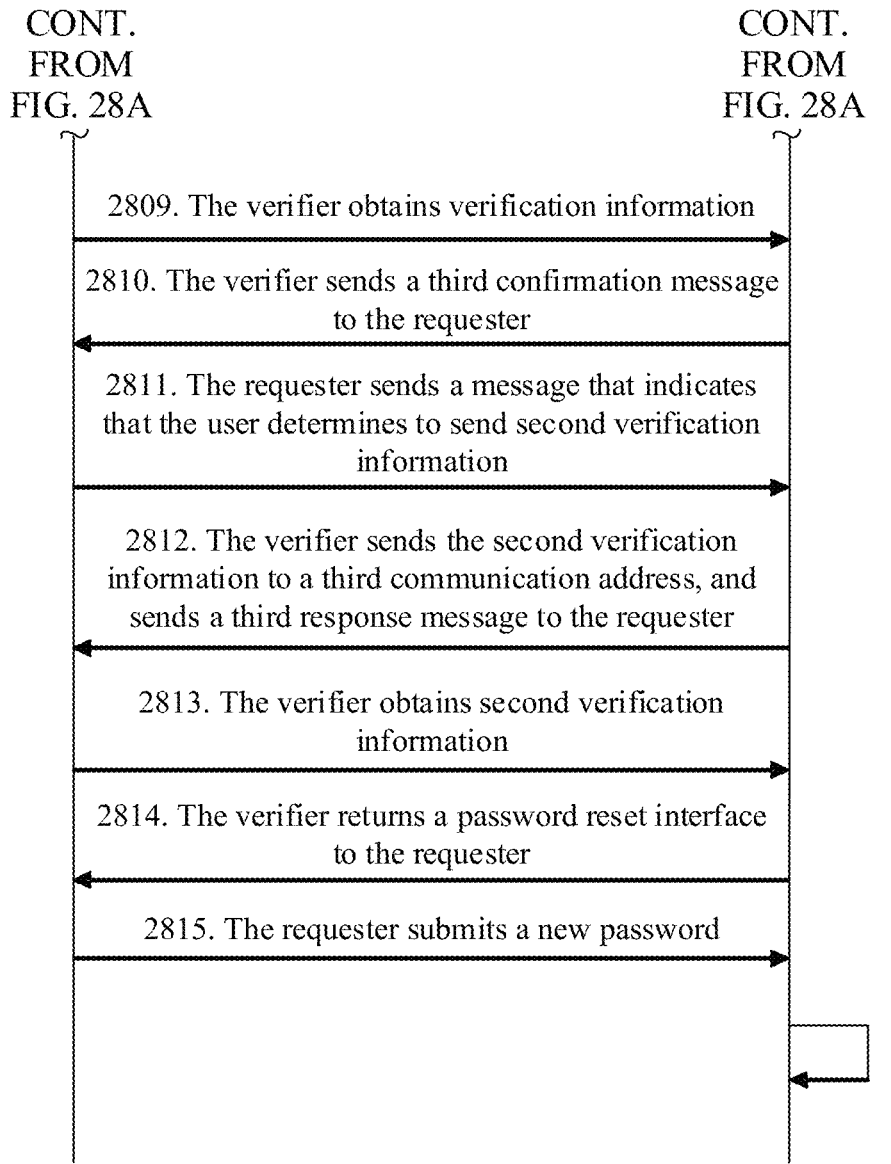

Therefore, in view of this problem, in an embodiment of this application, to improve security performance, a process of performing verification for a plurality of times may be set. For example, as shown in FIG. 28A and FIG. 28B, in this embodiment of this application, after primary verification succeeds, double verification may be performed. Further, a method shown in FIG. 28A and FIG. 28B may include the following steps.

Step 2801. A requester sends a password reset request.

Step 2802. A verifier returns a verification interface to the requester.

Step 2803. The requester sends an account entered by a user for requesting password reset.

Step 2804. For a valid account, the verifier sends first confirmation information.

Step 2805. For an invalid account, the verifier sends second confirmation information having a same form as the first confirmation information.

Step 2806. The requester sends a message that indicates that the user determines to send verification information.

Step 2807. For the valid account, the verifier sends the verification information to a first communication address, and sends a first response message to the requester.

Step 2808. For the invalid account, the verifier sends, to the requester, a second response message having a same form as the first response message.

Step 2809. The requester sends verification information to the verifier.

It should be understood that step 2801 to step 2809 correspond to step 401 to step 409. To avoid repetition, details are not described herein again.

Step 2810. The verifier sends a third confirmation information to the requester.

Further, the verification information in step 2809 may be first verification information. After the verifier obtains the first verification information sent by the user, if the verifier verifies that the first verification information is accurate, the verifier sends the third confirmation information to the requester. The third confirmation information is used to enable the requester to display, to the user, fifth binding information associated with the account, and request the user to determine whether to send second verification information to a third communication address associated with the account, and the fifth binding information is information that corresponds to the account and that is known by the user.

That is, in this embodiment of this application, after verification on the first verification information succeeds, the user may be verified again by sending the third confirmation message.

For example, the first verification information is information sent by the verifier to a mobile phone associated with the account, and the second verification information may be information sent to a mailbox associated with the account. Alternatively, the first verification information is information sent by the verifier to a mailbox associated with the account, and the second verification information may be information sent to a mobile phone associated with the account. This embodiment of this application is not limited thereto.

It should be understood that the second verification information is information generated by the verifier, and a definition of the second verification information is similar to that of the first verification information. To avoid repetition, details are not described herein again. It should be understood that the second verification information is different from the first verification information.

It should be understood that a definition of the fifth binding information is similar to that of first binding information. To avoid repetition, details are not described herein again.

Step 2811. The requester sends a message that indicates that the user determines to send the second verification information.

The requester sends, to the service verifier, the message that indicates that the user determines to send the second verification information.

Further, a specific process in which the requester sends the message that indicates that the user determines to send the second verification information in step 2811 is similar to that in which the requester sends the message that indicates that the user determines to send the first verification information in step 2806. To avoid repetition, details are not described herein again.

Step 2812. The verifier sends the second verification information to the third communication address, and sends a third response message to the requester.

Further, the server verifier sends the second verification information to the third communication address, and sends the third response message to the requester, and the third response message is used to prompt the user that the server verifier has sent the second verification information to the third communication address.

Further, a specific process in which the verifier sends the second verification information and the third response message in step 2812 is similar to a process in which the verifier sends the first verification information and the first response message in step 2807. To avoid repetition, details are not described herein again.

Step 2813. The verifier obtains second verification information.

It should be understood that a specific process in which the verifier obtains the second verification information in step 2813 is similar to a process of obtaining the first verification information in step 2809. To avoid repetition, details are not described herein again.

Step 2814. The verifier returns a password reset interface to the requester.

Step 2815. The requester submits a new password.

Step 2816. The verifier stores the new password.

It should be understood that step 2814 to step 2816 correspond to step 410 to step 412. To avoid repetition, details are not described herein again.

Therefore, in this embodiment of this application, an attack from an attacker can be prevented in a process of performing two or more times of verification such that password reset security is improved.

It should be understood that, with reference to FIG. 1 to FIG. 28A and FIG. 28B, the foregoing describes an example in which first binding information and second binding information are anonymously displayed. A common user can identify, using confirmation information about whether to send verification information to a communication address associated with an account, whether the entered account belongs to the common user. In this way, interference to another user is avoided. If the user enters an incorrect account, a server still returns fake confirmation information such that a hacker attacker cannot identify, using the confirmation information, whether the entered account is valid in order to prevent an "account enumeration" attack. However, the hacker may enter all accounts by brute force, and then click/tap "determine to send verification information" or "determine to obtain verification information", to send verification information to a valid account in the accounts entered by brute force, resulting in interference to the common user.

Therefore, to prevent the hacker from entering the accounts by brute force to cause interference to the common user, when the confirmation information is returned, the user may be required to enter known preset information (for example, enter an anonymous part of the preset information) in the embodiments of this application. The server triggers a real send operation only when the account is valid and entered preset information is correct. Therefore, interference caused by the brute-force cracking to the common user can be avoided in this application.

Figure 29:
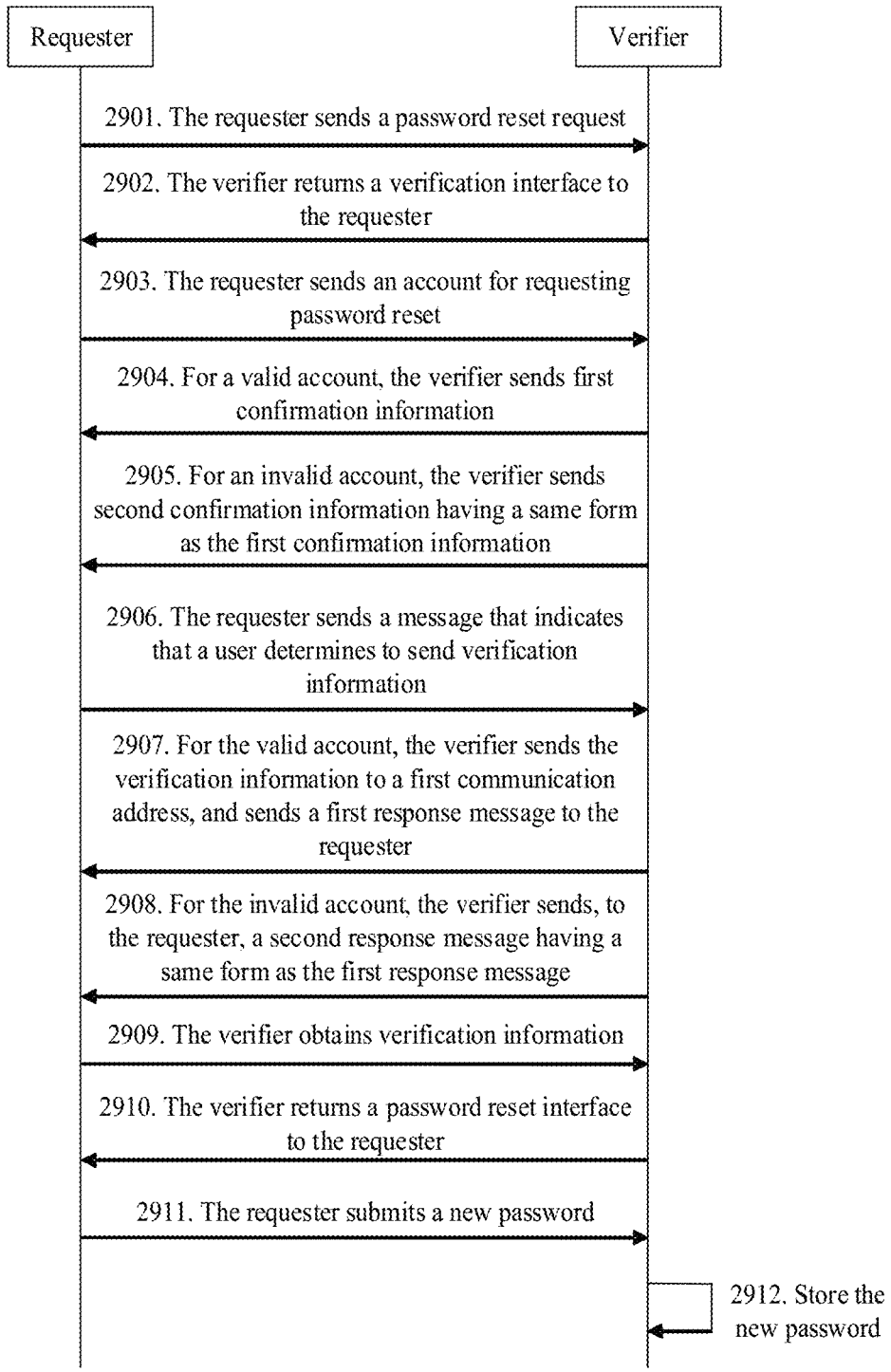
FIG. 29 is a schematic flowchart of a password reset method according to another embodiment of this application.

The following provides a detailed description with reference to FIG. 29.

As shown in FIG. 29, in this embodiment of this application, after a user submits an account for changing a password, the user is required to determine whether to send verification information to an anonymously displayed address bound to the account, and the user is required to supplement an anonymous part. A method shown in FIG. 29 may include the following steps.

Step 2901. A requester sends a password reset request.

Step 2902. A verifier returns a verification interface to the requester.

Step 2903. The requester sends an account entered by a user for requesting password reset.

It should be understood that step 2901 to step 2903 correspond to step 401 to step 403. To avoid repetition, details are not described herein again.

Step 2904. For a valid account, the verifier sends first confirmation information.

The first confirmation information is used to enable the requester to request the user to determine whether to send verification information to an anonymously displayed first communication address associated with the account, and enable the requester to request the user to enter an anonymous part of the first communication address.

Figure 30:
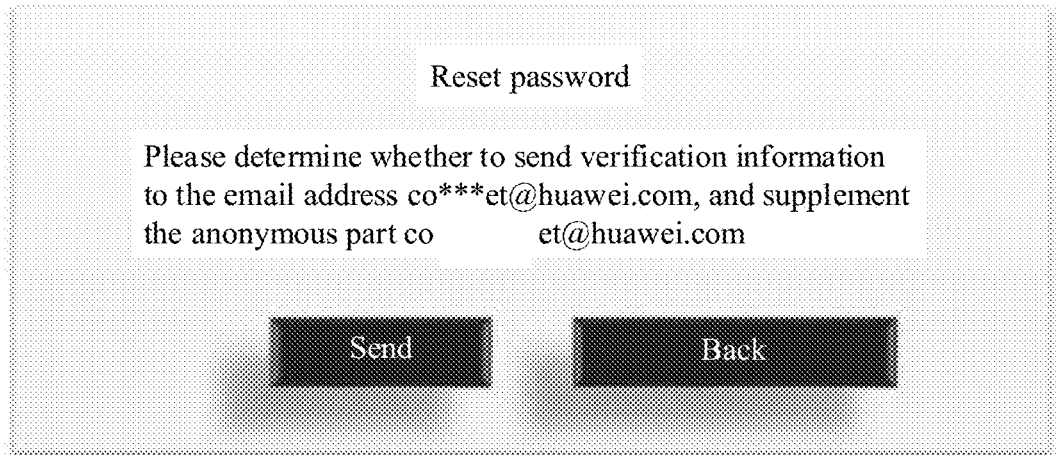
FIG. 30 is a schematic diagram of an interface displayed by a requester in a password reset process according to another embodiment of this application.

For example, as shown in FIG. 30, when the account is valid, if the first communication address is corenet@huawei.com, the requester displays "please determine whether to send verification information to an email address co*et@huawei.com, and supplement an anonymous part co*et@huawei.com" to the user.

Figure 31:
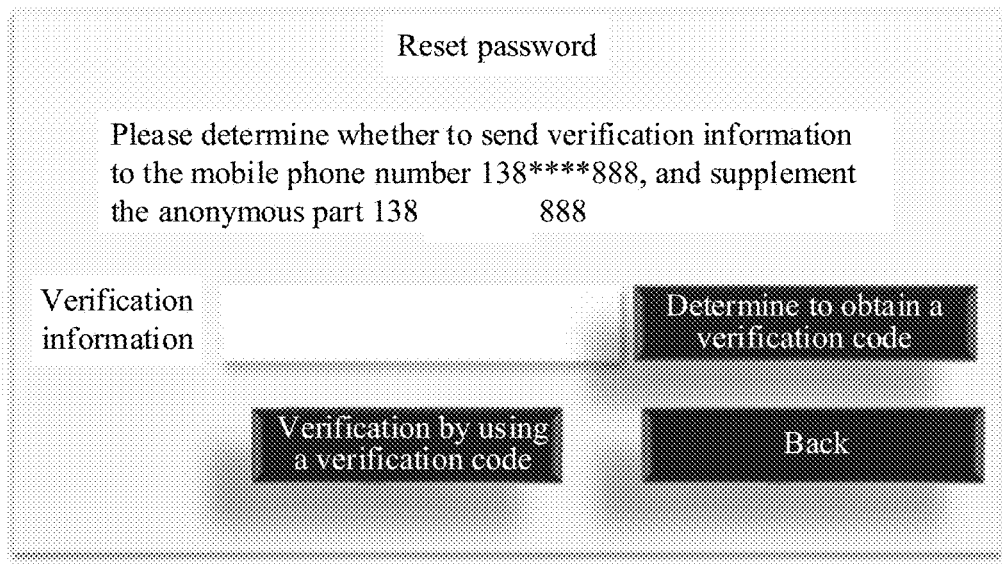
FIG. 31 is a schematic diagram of an interface displayed by a requester in a password reset process according to another embodiment of this application.

For another example, as shown in FIG. 31, when the account is valid, if the first communication address is 13812345888, the requester displays "please determine whether to send verification information to a mobile phone number 138**888, and supplement an anonymous part 13*8***888" to the user.

Step 2905. For an invalid account, the verifier sends second confirmation information having a same form as the first confirmation information.

The second confirmation information is used to enable the requester to request the user to determine whether to send verification information to a second communication address associated with the account, and enable the requester to request the user to enter an anonymous part of the second communication address.

It should be understood that the second communication address is in a one-to-one correspondence with the invalid account entered by the user, and the second communication address is generated by the verifier based on the invalid account. Further, for a manner of generating the second communication address, refer to the foregoing description. Details are not described herein again.

Step 2906. The requester sends a message that indicates that the user determines to send the verification information.

The verifier obtains the message that is sent by the requester and that indicates that the user determines to send the verification information, and the message that indicates that the user determines to send the verification information carries the anonymous part entered by the user.

When the account is the valid account and the anonymous part entered by the user is correct, the verifier sends a sixth confirmation message to the requester, the sixth confirmation message is used to enable the requester to request the user to confirm sixth binding information associated with the account, and the sixth binding information is information that corresponds to the account and that is known by the user.

After the verifier obtains a message that is sent by the requester and that indicates that the user confirms the sixth binding information, the verifier sends the verification information to the first communication address, and sends a sixth response message to the requester, and the sixth response message is used to enable the requester to prompt the user that the verifier has sent the verification information to the first communication address.

Alternatively, the verifier obtains the message that is sent by the requester and that indicates that the user determines to send the verification information, and the message that indicates that the user determines to send the verification information carries the anonymous part entered by the user.

When the account is the invalid account or the anonymous part entered by the user is incorrect, the verifier generates, based on the anonymous part entered by the user and/or the account, seventh binding information corresponding to the account, and sends a seventh confirmation message to the requester, the seventh confirmation message is used to enable the requester to request the user to confirm the seventh binding information associated with the account, and the seventh binding information and the sixth binding information have a same form.

After the verifier obtains a message that is sent by the requester and that indicates that the user confirms the seventh binding information, the verifier directly sends, to the requester, a seventh response message having a same form as the sixth response message, and the seventh response message is used to enable the requester to prompt the user that the verifier has sent the verification information to the second communication address.

Figure 32:
FIG. 32 is a schematic diagram of an interface displayed by a requester in a password reset process according to another embodiment of this application.
Figure 33:
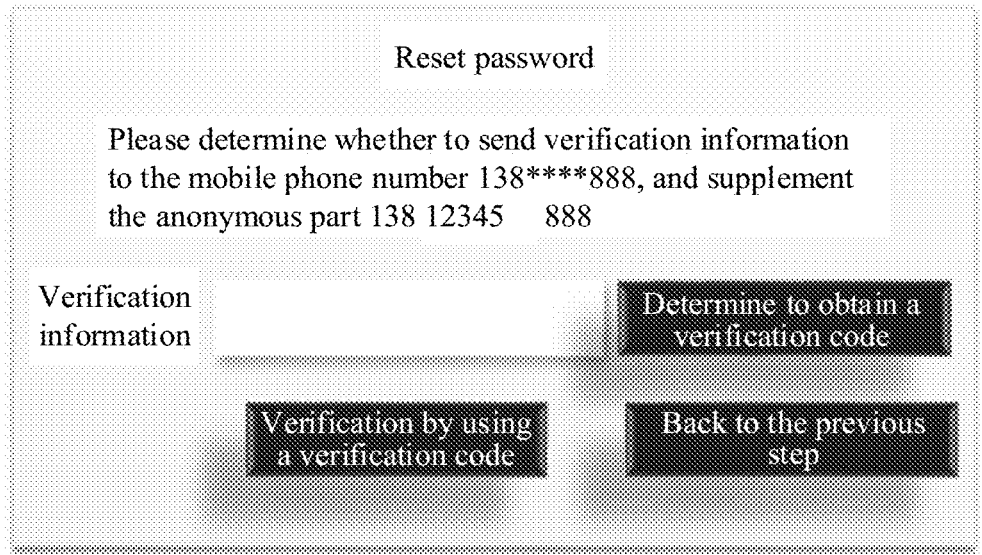
FIG. 33 is a schematic diagram of an interface displayed by a requester in a password reset process according to another embodiment of this application.

Further, as shown in FIG. 32 or FIG. 33, the user enters the anonymous part and clicks/taps "confirm" to send the verification information. Then, the requester displays, to the user, information bound to the account such that the user performs double confirmation. Optionally, if the communication address associated with the account in step 2904 or step 2905 is an email address, the information bound to the account in step 2906 is a mobile phone number. Alternatively, if the communication address associated with the account in step 2904 or step 2905 is a mobile phone number, the information bound to the account in step 2906 is an email address.

Optionally, the information bound to the account in step 2906 may alternatively be other information, for example, anonymously displayed information such as a name, an occupation, or an employee ID of the user.

Figure 34:
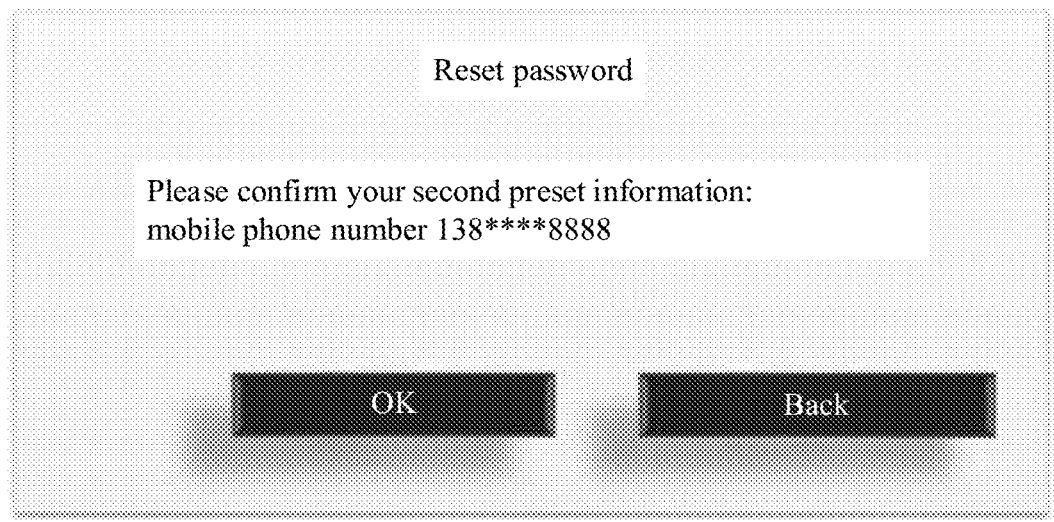
FIG. 34 is a schematic diagram of an interface displayed by a requester in a password reset process according to another embodiment of this application.

As shown in FIG. 34, the requester displays the following information: "please confirm your second preset information (which corresponds to the sixth binding information or the seventh binding information in the foregoing description): a mobile phone number 138****8888" to the user.

It should be understood that, the sixth binding information is preset information, and may be information known by the user, and the seventh binding information is information that is generated by the verifier and that is in a one-to-one correspondence with the account and/or the anonymous part that are/is entered by the user.

After the user clicks/taps "confirm" again, if both the account and the anonymous part entered by the user are correct, the verifier sends the verification information to the first communication address corresponding to the account, and the requester displays "verification information has been sent" to the user.

Alternatively, if the account or the anonymous part entered by the user are incorrect, the verifier sends no verification information, and the requester displays "verification information has been sent" to the user.

Figure 35:
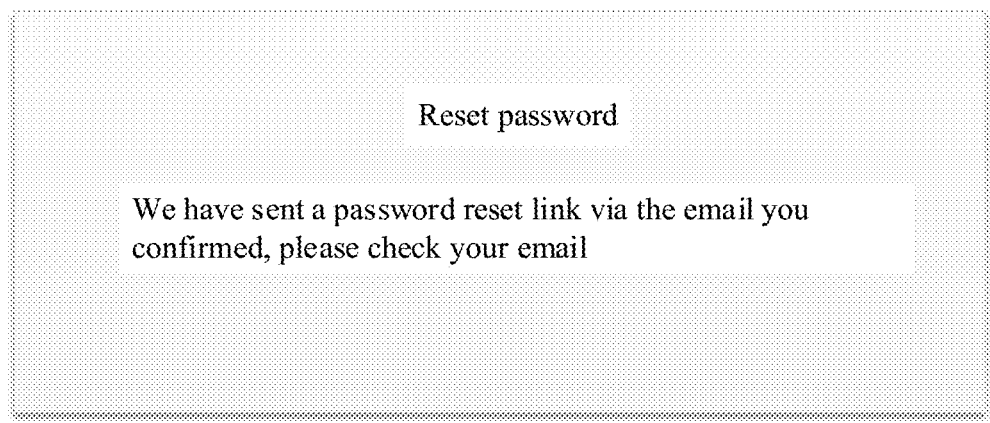
FIG. 35 is a schematic diagram of an interface displayed by a requester in a password reset process according to another embodiment of this application.

Further, corresponding to the valid account, for FIG. 30, as shown in FIG. 35, the requester displays the following information: "we have sent a password reset link via the email you confirmed, please check your email" to the user.

Figure 36:
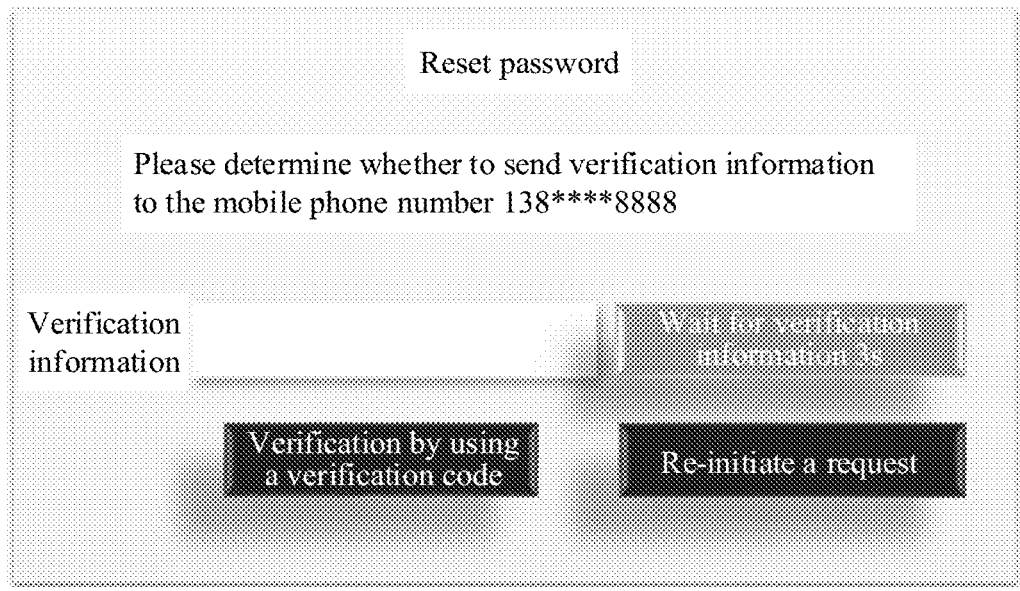
FIG. 36 is a schematic diagram of an interface displayed by a requester in a password reset process according to another embodiment of this application.

For another example, for FIG. 31, the requester displays, to the user, information shown in FIG. 36, namely, "wait for verification information".

For example, for the invalid account, the verifier sends no verification information, and the requester displays information similar to that shown in FIG. 35 or FIG. 36.

Further, the verifier receives the anonymous part entered by the user. If the entered anonymous part and account are both valid, the sixth confirmation message is sent such that the user can confirm whether the previously entered preset information or account is correct. If the user finds that the sixth binding information is not information that is previously bound to the valid account, the user may confirm that previous input may be incorrect such that the user can perform modification in a timely manner for re-entering. If the preset information or the account entered by the user is incorrect, a service returns, to the user, fake confirmation message (namely, the seventh confirmation message) that has a same form as the sixth confirmation message and that is in a one-to-one correspondence with the incorrect account such that external cracking can be avoided.

Alternatively, in actual application, after the user confirms the verification information sent by the verifier, the user may not need to further confirm another piece of binding information. That is, the step shown in FIG. 32 may not be performed.

Further, the verifier obtains the message that is sent by the requester and that indicates that the user determines to send the verification information, and the message that indicates that the user determines to send the verification information carries the anonymous part entered by the user.

When the account is the valid account and the anonymous part entered by the user is correct, the verifier sends the verification information to the first communication address, and sends a fourth response message to the requester, and the fourth response message is used to enable the requester to prompt the user that the verifier has sent the verification information to the first communication address.

For example, for FIG. 30, as shown in FIG. 35, the requester displays the following information: "we have sent a password reset link via the email you confirmed, please check your email" to the user.

For another example, for FIG. 31, the requester displays, to the user, information shown in FIG. 36, namely, "wait for verification information".

Alternatively, when the account is the invalid account or the anonymous part entered by the user is incorrect, the verifier directly sends, to the requester, a fifth response message having a same form as the fourth response message, and the fifth response message is used to enable the requester to prompt the user that the verifier has sent the verification information to the second communication address. For example, for the invalid account, information similar to that shown in FIG. 35 or FIG. 36 is displayed.

In this case, the user performs no double confirmation, and therefore, a quantity of interaction times can be reduced, and a total password reset time can be reduced.

Step 2907. For the valid account, the verifier sends the verification information to the first communication address, and sends a first response message to the requester.

Further, the requester displays, to the user, content shown in FIG. 33 or FIG. 34.

Step 2908. For the invalid account, the verifier sends, to the requester, a second response message having a same form as the first response message.

Further, the requester displays, to the user, content shown in FIG. 33 or FIG. 34.

Step 2909. The verifier obtains verification information.

Step 2910. The verifier returns a password reset interface to the requester.

Step 2911. The requester submits a new password.

Step 2912. The verifier stores the new password.

It should be understood that step 2907 to step 2912 correspond to step 407 to step 412. To avoid repetition, details are not described herein again.

Therefore, in this embodiment of this application, an attack from an attacker can be prevented in a process of performing two or more times of verification such that password reset security is improved.

It should be understood that the foregoing examples in FIG. 1 to FIG. 36 are merely intended to help a person skilled in the art understand the embodiments of this application, but are not intended to limit the embodiments of this application to a specific value or a specific scenario in the examples. A person skilled in the art definitely can make various equivalent modifications or changes based on the examples shown in FIG. 1 to FIG. 36, and such modifications or changes also fall within the scope of the embodiments of this application. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes the password reset method in the embodiments of this application in detail with reference to FIG. 1 to FIG. 36. The following describes a verifier in the embodiments of this application with reference to FIG. 37 and FIG. 39, and describes a requester in the embodiments of this application with reference to FIG. 38 and FIG. 40.

Figure 37:
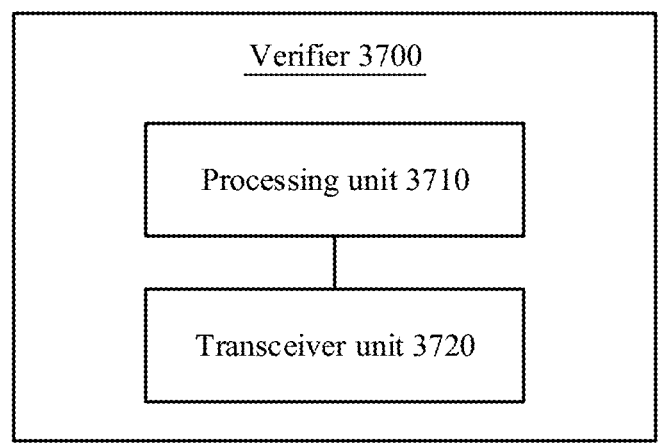
FIG. 37 is a schematic block diagram of a verifier according to an embodiment of this application.

FIG. 37 is a schematic block diagram of a verifier according to an embodiment of this application. The verifier is applied to a system including a requester and the verifier, and the requester needs to request, using an account and a password, the verifier to verify an identity. The verifier 3700 shown in FIG. 37 includes a processing unit 3710 and a transceiver unit 3720.

The transceiver unit 3720 is configured to receive an account sent by the requester for requesting password reset.

When the account is a valid account, the transceiver unit 3720 is further configured to send first confirmation information to the requester, where the first confirmation information is used to enable the requester to display, to a user, first binding information associated with the account, and request the user to determine whether to send verification information to a first communication address associated with the account, and the first binding information is information that corresponds to the account and that is known by the user.

Alternatively, when the account is an invalid account, the processing unit 3710 is configured to generate, based on the account, second binding information corresponding to the account, and the transceiver unit 3720 is further configured to send, to the requester, second confirmation information having a same form as the first confirmation information, where the second confirmation information is used to enable the requester to display the second binding information to the user, and request the user to determine whether to send verification information to a second communication address corresponding to the account, and the second binding information and the first binding information have a same form.

Therefore, in this application, corresponding fake confirmation information (namely, the second confirmation information) whose form is consistent with that of the first confirmation information is generated for the invalid account. Because the form of the fake confirmation information needs to be consistent with a form of confirmation information corresponding to a real account, a hacker cannot determine validity of the entered account using the confirmation information. Therefore, in this embodiment of this application, a problem that the hacker enumerates valid accounts using prompt information "invalid account" returned by a server can be resolved, and system security performance can be improved.

In addition, in this application, information known by the user or preset information is used as confirmation information. For a common user, if an incorrect account is entered, the common user may identify, using known information or preset information (namely, the foregoing first binding information), that returned information does not belong to the common user. Therefore, in this embodiment of this application, a problem that the user cannot perceive, in a timely manner, whether "an invalid account is entered" or "an account of another user is mistakenly entered" can also be resolved, and user experience can be improved.

Optionally, in another embodiment, the first binding information is the first communication address, and the second binding information is the second communication address.

Optionally, in another embodiment, the transceiver unit 3720 is further configured to obtain a message that is sent by the requester and that indicates that the user determines to send the verification information, and when the account is the valid account, send the verification information to the first communication address, and send a first response message to the requester, where the first response message is used to prompt the user that the verifier has sent the verification information to the first communication address, or when the account is the invalid account, directly send, to the requester, a second response message having a same form as the first response message, where the second response message is used to prompt the user that the verifier has sent the verification information to the second communication address.

Optionally, in another embodiment, in addition to being used to enable the requester to display, to the user, the first binding information associated with the account, and request the user to determine whether to send the verification information to the first communication address associated with the account, the first confirmation information is further used to enable the requester to display, to the user, third binding information associated with the account, and the third binding information is information that corresponds to the account and that is known by the user, and in addition to being used to enable the requester to display, to the user, the second binding information associated with the account, and request the user to determine whether to send the verification information to the second communication address, the second confirmation information is further used to enable the requester to display, to the user, fourth binding information corresponding to the account, and the fourth binding information is information that is generated by the processing unit 3710 and that has a same form as the third binding information.

Optionally, in another embodiment, when the account is the invalid account, the processing unit 3710 is further configured to generate, based on the account and a first key, the second binding information corresponding to the account.

Optionally, in another embodiment, the processing unit 3710 is further configured to obtain the first key, combine the first key and the account, to generate combined data, and generate the second binding information based on the combined data using a first function algorithm, where the first function algorithm is used to generate output information uniquely corresponding to one piece of input information.

Optionally, in another embodiment, the first communication address and the second communication address are anonymous information, the first confirmation information is used to enable the requester to request the user to determine whether to send the verification information to the first communication address associated with the account, and enable the requester to request the user to enter an anonymous part of the first communication address, and the second confirmation information is used to enable the requester to request the user to determine whether to send the verification information to the second communication address associated with the account, and enable the requester to request the user to enter an anonymous part of the second communication address.

Optionally, in another embodiment, the transceiver unit 3720 is further configured to obtain a message that is sent by the requester and that indicates that the user determines to send the verification information, where the message that indicates that the user determines to send the verification information carries the anonymous part entered by the user, and when the account is the valid account and the anonymous part entered by the user is correct, send the verification information to the first communication address, and send a fourth response message to the requester, where the fourth response message is used to enable the requester to prompt the user that the verifier has sent the verification information to the first communication address, or when the account is the invalid account or the anonymous part entered by the user is incorrect, directly send, to the requester, a fifth response message having a same form as the fourth response message, where the fifth response message is used to enable the requester to prompt the user that the verifier has sent the verification information to the second communication address.

Optionally, in another embodiment, the transceiver unit 3720 is further configured to obtain a message that is sent by the requester and that indicates that the user determines to send the verification information, where the message that indicates that the user determines to send the verification information carries the anonymous part entered by the user, when the account is the valid account and the anonymous part entered by the user is correct, send a sixth confirmation message to the requester, where the sixth confirmation message is used to enable the requester to request the user to confirm sixth binding information associated with the account, and the sixth binding information is information that corresponds to the account and that is known by the user, and after obtaining a message that is sent by the requester and that indicates that the user confirms the sixth binding information, send the verification information to the first communication address, and send a sixth response message to the requester, where the sixth response message is used to enable the requester to prompt the user that the verifier has sent the verification information to the first communication address.

Alternatively, the transceiver unit 3720 is further configured to obtain a message that is sent by the requester and that indicates that the user determines to send the verification information, where the message that indicates that the user determines to send the verification information carries the anonymous part entered by the user, when the account is the invalid account or the anonymous part entered by the user is incorrect, generate, based on the anonymous part entered by the user and/or the account, seventh binding information corresponding to the account, and send a seventh confirmation message to the requester, where the seventh confirmation message is used to enable the requester to request the user to confirm the seventh binding information associated with the account, and the seventh binding information and the sixth binding information have a same form, and after obtaining a message that is sent by the requester and that indicates that the user confirms the seventh binding information, directly send, to the requester, a seventh response message having a same form as the sixth response message, where the seventh response message is used to enable the requester to prompt the user that the verifier has sent the verification information to the second communication address.

Optionally, in another embodiment, the processing unit 3710 is further configured to when the verifier determines that a quantity of consecutive times for which the user requests password reset for the invalid account using the requester reaches a preset threshold, lock the request from the requester to the verifier.

Optionally, in another embodiment, the transceiver unit 3720 is further configured to obtain verification information sent by the user, when it is verified that the verification information is accurate, return a password reset interface to the requester, and obtain a new password that is submitted by the requester and that is entered by the user using the password reset interface.

Optionally, in another embodiment, the verification information is first verification information, and when the account is the valid account, the transceiver unit 3720 is further configured to obtain the first verification information sent by the user, and when the verifier verifies that the first verification information is accurate, send third confirmation information to the requester, where the third confirmation information is used to enable the requester to display, to the user, fifth binding information associated with the account, and request the user to determine whether to send second verification information to a third communication address associated with the account, and the fifth binding information is information that corresponds to the account and that is known by the user.

Optionally, in another embodiment, the transceiver unit 3720 is further configured to obtain a message that is sent by the requester and that indicates that the user determines to send the second verification information, and send the second verification information to the third communication address, and send a third response message to the requester, where the third response message is used to prompt the user that the verifier has sent the second verification information to the third communication address.

Optionally, in another embodiment, the transceiver unit 3720 is further configured to obtain the second verification information sent by the user, when it is verified that the second verification information is accurate, return a password reset interface to the requester, and obtain a new password that is submitted by the requester and that is entered by the user using the password reset interface.

Optionally, in another embodiment, all of the first binding information, the second binding information, and the third binding information are anonymous information.

Optionally, in another embodiment, the password includes a PIN, a key, a private key, or a character string specified by the user, and the account includes an email address, a mobile phone number, an account of a third-party application, or a character string registered by the user with the verifier.

It should be understood that the verifier shown in FIG. 37 can implement the processes related to the verifier in the method embodiments in FIG. 1 to FIG. 36. Operations and/or functions of the modules in the verifier 3700 are respectively used to implement corresponding processes in the method embodiments in FIG. 1 to FIG. 36. For details, refer to the descriptions in the method embodiments. To avoid repetition, detailed descriptions are appropriately omitted herein.

Figure 38:
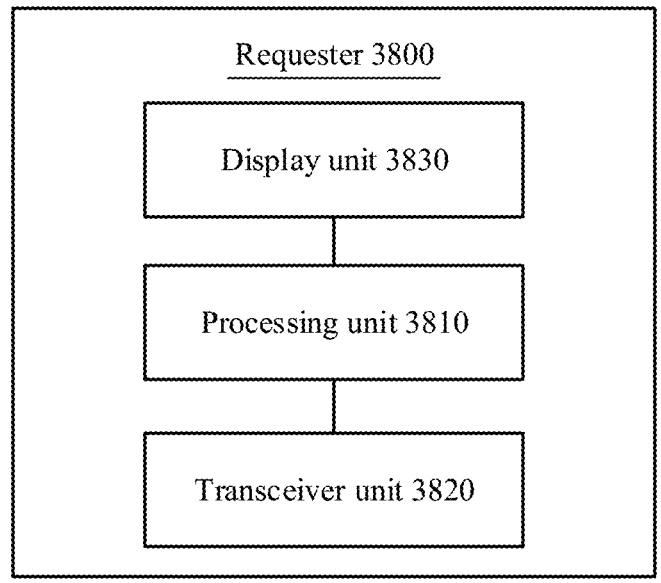
FIG. 38 is a schematic block diagram of a requester according to an embodiment of this application.

FIG. 38 is a schematic block diagram of a requester according to an embodiment of this application. The requester is applied to a system including the requester and a verifier, and the requester needs to request, using an account and a password, the verifier to verify an identity. The requester 3800 shown in FIG. 38 includes a processing unit 3810, a transceiver unit 3820, and a display unit 3830.

Further, the processing unit 3810 is configured to control the transceiver unit 3820 to send, to the verifier, an account for requesting password reset, and when the verifier determines that the account is a valid account, receive first confirmation information sent by the verifier, where the first confirmation information is used to enable the display unit 3830 to display, to a user, first binding information associated with the account, and request the user to determine whether to send verification information to a first communication address associated with the account, and the first binding information is information that corresponds to the account and that is known by the user, or when the verifier determines that the account is an invalid account, receive second confirmation information that is sent by the verifier and that has a same form as the first confirmation information, where the second confirmation information is used to enable the display unit 3830 to display the second binding information to the user, and request the user to determine whether to send verification information to a second communication address corresponding to the account, the second binding information is information that is generated by the verifier based on the account and that corresponds to the account, and the second binding information and the first binding information have a same form.

Therefore, in this application, corresponding fake confirmation information (namely, the second confirmation information) whose form is consistent with that of the first confirmation information is generated for the invalid account. Because the form of the fake confirmation information needs to be consistent with a form of confirmation information corresponding to a real account, a hacker cannot determine validity of the entered account using the confirmation information. Therefore, in this embodiment of this application, a problem that the hacker enumerates valid accounts using prompt information "invalid account" returned by a server can be resolved, and system security performance can be improved.

In addition, in this application, information known by the user or preset information is used as confirmation information. For a common user, if an incorrect account is entered, the common user may identify, using known information or preset information (namely, the foregoing first binding information), that returned information does not belong to the common user. Therefore, in this embodiment of this application, a problem that the user cannot perceive, in a timely manner, whether "an invalid account is entered" or "an account of another user is mistakenly entered" can also be resolved, and user experience can be improved.

Optionally, in another embodiment, the first binding information is the first communication address, and the second binding information is the second communication address.

Optionally, in another embodiment, the transceiver unit 3820 is further configured to send, to the verifier, a message that indicates that the user determines to send the verification information, and when the account is the valid account, obtain a first response message sent by the verifier, where the first response message is used to prompt the user that the verifier has sent the verification information to the first communication address, and the first response message is sent after the verifier sends the verification information to the first communication address, or when the account is the invalid account, obtain a second response message that is sent by the verifier and that has a same form as the first response message, where the second response message is used to prompt the user that the verifier has sent the verification information to the second communication address, and the second response message is directly sent after the verifier obtains the message that indicates that the user determines to send the verification information.

Optionally, in another embodiment, in addition to being used to enable the display unit 3830 to display, to the user, the first binding information associated with the account, and request the user to determine whether to send the verification information to the first communication address associated with the account, the first confirmation information is further used to enable the display unit 3830 to display, to the user, third binding information associated with the account, and the third binding information is information that corresponds to the account and that is known by the user, and in addition to being used to enable the display unit 3830 to display, to the user, the second binding information associated with the account, and request the user to determine whether to send the verification information to the second communication address, the second confirmation information is further used to enable the display unit 3830 to display, to the user, fourth binding information that corresponds to the account and that has a same form as the first binding information, and the fourth binding information is information that is generated by the verifier and that has a same form as the third binding information.

Optionally, in another embodiment, the first communication address and the second communication address are anonymous information, the first confirmation information is used to enable the requester to request the user to determine whether to send the verification information to the first communication address associated with the account, and enable the requester to request the user to enter an anonymous part of the first communication address, and the second confirmation information is used to enable the requester to request the user to determine whether to send the verification information to the second communication address associated with the account, and enable the requester to request the user to enter an anonymous part of the second communication address.

Optionally, in another embodiment, the transceiver unit 3820 is further configured to send, to the verifier, a message that indicates that the user determines to send the verification information, where the message that indicates that the user determines to send the verification information carries the anonymous part entered by the user, and receive a fourth response message sent by the verifier, where the fourth response message is sent by the verifier when the account is the valid account and the anonymous part entered by the user is correct and after the verifier sends the verification information to the first communication address, and the fourth response message is used to enable the requester to prompt the user that the verifier has sent the verification information to the first communication address, or receive a fifth response message that is directly sent by the verifier and that has a same form as the fourth response message, where the fifth response message is sent by the verifier when the account is the invalid account or the anonymous part entered by the user is incorrect, and the fifth response message is used to enable the requester to prompt the user that the verifier has sent the verification information to the second communication address.

Optionally, in another embodiment, the transceiver unit 3820 is further configured to send, to the verifier, a message that indicates that the user determines to send the verification information, where the message that indicates that the user determines to send the verification information carries the anonymous part entered by the user, receive a sixth confirmation message sent by the verifier, where the sixth confirmation message is sent by the verifier when the account is the valid account and the anonymous part entered by the user is correct, the sixth confirmation message is used to enable the requester to request the user to confirm sixth binding information associated with the account, and the sixth binding information is information that corresponds to the account and that is known by the user, send, to the verifier, a message that indicates that the user confirms the sixth binding information, and receive a sixth response message sent by the verifier, where the sixth response message is sent after the verifier sends the verification information to the first communication address, and the sixth response message is used to enable the requester to prompt the user that the verifier has sent the verification information to the first communication address.

Alternatively, the transceiver unit 3820 is further configured to send, to the verifier, a message that indicates that the user determines to send the verification information, where the message that indicates that the user determines to send the verification information carries the anonymous part entered by the user, receive a seventh confirmation message sent by the verifier, where the seventh confirmation message is sent by the verifier when the account is the invalid account or the anonymous part entered by the user is incorrect, the seventh confirmation message is used to enable the requester to request the user to confirm seventh binding information associated with the account, the seventh binding information and the sixth binding information have a same form, and the seventh binding information is generated by the verifier based on the anonymous part entered by the user and/or the account, send, to the verifier, a message that indicates that the user confirms the seventh binding information, and receive a seventh response message that is directly sent by the verifier and that has a same form as the sixth response message, where the seventh response message is used to enable the requester to prompt the user that the verifier has sent the verification information to the second communication address.

Optionally, in another embodiment, the transceiver unit 3820 is further configured to obtain a password reset interface sent by the verifier, where the password reset interface is sent after the verifier verifies that verification information sent by the user is accurate, and submit, to the verifier, a new password entered by the user using the password reset interface.

Optionally, in another embodiment, the verification information is first verification information, and when the account is the valid account, the transceiver unit 3820 is further configured to receive third confirmation information sent by the verifier, where the third confirmation information is used to enable the requester to display, to the user, fifth binding information associated with the account, and request the user to determine whether to send second verification information to a third communication address associated with the account, the fifth binding information is information that corresponds to the account and that is known by the user, and the third confirmation information is sent after the verifier obtains the first verification information sent by the user.

Optionally, in another embodiment, the transceiver unit 3820 is further configured to send, to the verifier, a message that indicates that the user determines to send the second verification information, and receive a third response message sent by the verifier, where the third response message is used to prompt the user that the verifier has sent the second verification information to the third communication address, and the third response message is sent after the verifier sends the second verification information to the third communication address.

Optionally, in another embodiment, the transceiver unit 3820 is further configured to obtain a password reset interface sent by the verifier, where the password reset interface is sent after the verifier verifies that the second verification information sent by the user is accurate, and submit, to the verifier, a new password entered by the user using the password reset interface.

Optionally, in another embodiment, all of the first binding information, the second binding information, and the third binding information are anonymous information.

Optionally, in another embodiment, the password includes a PIN, a key, a private key, or a character string specified by the user, and the account includes an email address, a mobile phone number, an account of a third-party application, or a character string registered by the user with the verifier.

It should be understood that the requester shown in FIG. 38 can implement the processes related to the requester in the method embodiments in FIG. 1 to FIG. 36. Operations and/or functions of the modules in the requester 3800 are respectively used to implement corresponding processes in the method embodiments in FIG. 1 to FIG. 36. For details, refer to the descriptions in the method embodiments. To avoid repetition, detailed descriptions are appropriately omitted herein.

Figure 39:
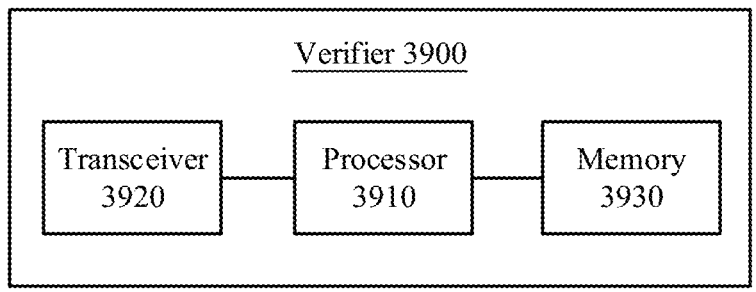
FIG. 39 is a schematic block diagram of a verifier according to another embodiment of this application.

FIG. 39 is a schematic block diagram of a verifier 3900 according to an embodiment of this application. Further, as shown in FIG. 39, the verifier 3900 includes a processor 3910 and a transceiver 3920, and the processor 3910 is connected to the transceiver 3920. Optionally, the verifier 3900 further includes a memory 3930. The memory 3930 is connected to the processor 3910. The processor 3910, the memory 3930, and the transceiver 3920 communicate with each other using an internal connection path, to transmit a control signal and/or a data signal. The memory 3930 may be configured to store an instruction. The processor 3910 is configured to execute the instruction stored in the memory 3930, and control the transceiver 3920 to receive or send information or a signal. The processor 3910 can complete, by executing the instruction in the memory 3930, all processes related to the verifier in the method embodiments in FIG. 1 to FIG. 36. To avoid repetition, details are not described herein again.

It should be understood that the verifier 3900 may correspond to the verifier 3700 in FIG. 37, a function of the processing unit 3710 in the verifier 3700 may be implemented by the processor 3910, a function of the transceiver unit 3720 may be implemented by the transceiver 3920, and a function of the display unit 3830 may be implemented by the display 3940.

Therefore, in this application, corresponding fake confirmation information (namely, second confirmation information) whose form is consistent with that of first confirmation information is generated for an invalid account. Because the form of the fake confirmation information needs to be consistent with a form of confirmation information corresponding to a real account, a hacker cannot determine validity of an entered account using the confirmation information. Therefore, in this embodiment of this application, a problem that the hacker enumerates valid accounts using prompt information "invalid account" returned by a server can be resolved, and system security performance can be improved.

In addition, in this application, information known by a user or preset information is used as confirmation information. For a common user, if an incorrect account is entered, the common user may identify, using known information or preset information (namely, the foregoing first binding information), that returned information does not belong to the common user. Therefore, in this embodiment of this application, a problem that the user cannot perceive, in a timely manner, whether "an invalid account is entered" or "an account of another user is mistakenly entered" can also be resolved, and user experience can be improved.

Figure 40:
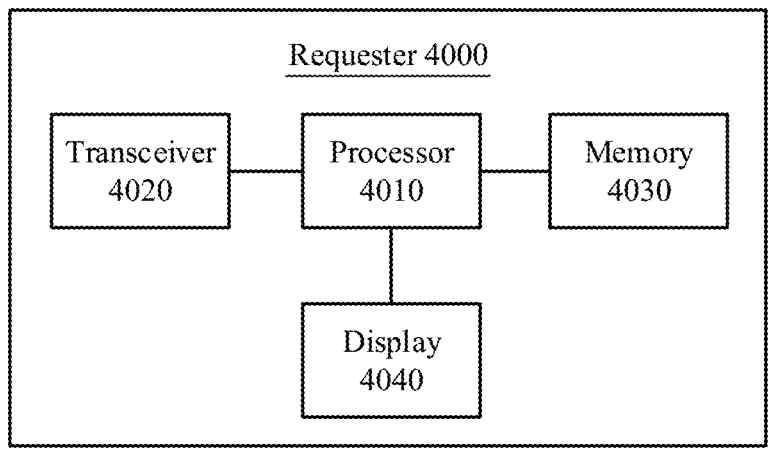
FIG. 40 is a schematic block diagram of a requester according to another embodiment of this application.

FIG. 40 is a schematic block diagram of a requester 4000 according to an embodiment of this application. Further, as shown in FIG. 40, the requester 4000 includes a processor 4010 and a transceiver 4020, and the processor 4010 is connected to the transceiver 4020. Optionally, the requester 4000 further includes a memory 4030. The memory 4030 is connected to the processor 4010. Optionally, the requester 4000 may further include a display 4040. The processor 4010, the memory 4030, the display 4040, and the transceiver 4020 communicate with each other using an internal connection path, to transmit a control signal and/or a data signal. The memory 4030 may be configured to store an instruction. The display 4040 is configured to display information to a user. The processor 4010 is configured to execute the instruction stored in the memory 4030, and control the transceiver 4020 to receive or send information or a signal. The controller 4010 can complete, by executing the instruction in the memory 4030, all processes related to the requester in the method embodiments in FIG. 1 to FIG. 36. To avoid repetition, details are not described herein again.

It should be understood that the requester 4000 may correspond to the requester 3800 in FIG. 38, a function of the processing unit 3810 in the requester 3800 may be implemented by the processor 4010, and a function of the transceiver unit 3820 may be implemented by the transceiver 4020.

Therefore, in this application, corresponding fake confirmation information (namely, second confirmation information) whose form is consistent with that of first confirmation information is generated for an invalid account. Because the form of the fake confirmation information needs to be consistent with a form of confirmation information corresponding to a real account, a hacker cannot determine validity of an entered account using the confirmation information. Therefore, in this embodiment of this application, a problem that the hacker enumerates valid accounts using prompt information "invalid account" returned by a server can be resolved, and system security performance can be improved.

In addition, in this application, information known by a user or preset information is used as confirmation information. For a common user, if an incorrect account is entered, the common user may identify, using known information or preset information (namely, the foregoing first binding information), that returned information does not belong to the common user. Therefore, in this embodiment of this application, a problem that the user cannot perceive, in a timely manner, whether "an invalid account is entered" or "an account of another user is mistakenly entered" can also be resolved, and user experience can be improved.

It should be understood that the requester 4000 may further include another component, for example, components such as an input unit, a communications unit, and a peripheral interface. The components perform communication using one or more buses. A person skilled in the art may understand that a structure of the requester shown in the figure constitutes no limitation on this application. The structure may be a bus structure or a star structure, and may alternatively include more or fewer components than those shown in the figure, combine some components, or have different component arrangements in an implementation of this application.

The input unit is configured to implement interaction between the user and the requester, and/or enter information to a mobile terminal. For example, the input unit may receive digital or character information entered by the user, to generate signal input related to a user setting or function control. In a specific implementation of this application, the input unit may be a touch panel, may be another human-machine interaction interface such as a physical input key or a microphone, or may be another external information capture apparatus such as a camera. The touch panel, also referred to as a touchscreen or a touch control screen, may collect a touch operation action or an approaching operation action performed by the user on the touch panel, such as an operation action performed by the user on the touch panel or at a position near the touch panel using any appropriate object or accessory such as a finger or a stylus, and drive a corresponding connection apparatus according to a preset program. Optionally, the touch panel may include two parts a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into contact coordinates, and then sends the contact coordinates to a processing unit. The touch controller may further receive a command sent by the processing unit and execute the command. In addition, the touch panel may be implemented using a plurality of types, such as a resistive type, a capacitive type, an infrared type, and a surface acoustic wave type. In another implementation of this application, the physical input key used by the input unit may include but is not limited to one or more of a physical keyboard, a function key (such as a volume control key or an on/off key), a trackball, a mouse, and a joystick. The input unit in a form of a microphone may collect voice that is input by the user or from an environment and convert the voice into a command that can be executed by the processing unit and that is in a form of an electrical signal.

The processor is a control center of the requester, is connected to all parts of the entire requester using various interfaces and lines, and performs various functions of the requester and/or processes data by running or executing a software program and/or a module stored in a storage unit and by invoking data stored in the storage unit.

The communications unit is configured to set up a communication channel such that the requester is connected to a verifier using the communication channel and exchanges data with the verifier using the communication channel.

The display 4040 may also be referred to as an output unit, and the output unit may include but is not limited to an image output unit, a sound output unit, and a touch output unit. The image output unit is configured to output a text, an image, and/or a video. The image output unit may include a display panel, for example, a display panel configured in a form of liquid-crystal display (LCD), an organic light-emitting diode (OLED), or a field emission display (FED). Alternatively, the image output unit may include a reflective display, such as an electrophoretic display or a display using an interferometric modulation of light technology. The image output unit may include a single display or a plurality of displays of different sizes. In a specific implementation of this application, the touch panel used for the input unit can also serve as the display panel of the output unit. For example, after detecting a touch gesture operation or an approaching gesture operation on the touch panel, the touch panel transmits the operation to the processing unit to determine a type of a touch event. Then, the processing unit provides a corresponding visual output on the display panel based on the type of the touch event. The input unit and the output unit are used as two independent components to implement input and output functions of the mobile terminal. However, in some embodiments, the touch panel and the display panel may be integrated to implement the input and output functions of the mobile terminal. For example, the image output unit may display various graphical user interfaces (GUIs) as virtual control components, including but not limited to a window, a scroll bar, an icon, and a scrap book, to be operated by the user in a touch manner.

It should be noted that the processor (for example, the processors in FIG. 39 and FIG. 40) in the embodiments of this application may be an integrated circuit chip that has a signal processing capability. In an implementation process, steps in the foregoing method embodiments can be completed using a hardware integrated logical circuit in the processor, or an instruction in a form of software. The foregoing processor may be a general-purpose processor, a digital signal processor (DSP), an application-specific integrated circuit (ASIC), a field programmable gate array (FPGA) or another programmable logic device (PLD), a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished using a hardware decoding processor, or may be executed and accomplished using a combination of hardware and software modules in the decoding processor. The software module may be located in a mature storage medium in the art, such as a random-access memory (RAM), a flash memory, a read-only memory (ROM), a programmable ROM (PROM), an electrically erasable PROM (EEPROM), or a register. The storage medium is located in the memory, and the processor reads information from the memory and completes the steps in the foregoing methods in combination with hardware of the processor.

It may be understood that the memory (for example, the memories in FIG. 39 and FIG. 40) in the embodiments of this application may be a volatile memory or a non-volatile memory, or may include both a volatile memory and a non-volatile memory. The non-volatile memory may be a ROM, a PROM, an erasable PROM (EPROM), an EEPROM, or a flash memory. The volatile memory may be a RAM, and the volatile memory is used as an external cache. By way of example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM. It should be noted that, the memory in the system and method described in this specification includes but is not limited to these memories and any memory of another proper type.

The application program includes any application installed on the requester, including but not limited to a browser, an email, an instant messaging service, text processing, keyboard virtualization, a window widget, encryption, digital copyright management, speech recognition, voice replication, positioning (for example, a function provided by a global positioning system), music playing, and the like.

It should be understood that the transceiver unit or the transceiver in the embodiments of this application may also be referred to as a communications unit.

An embodiment of this application further provides a processing apparatus, including a processor and an interface. The processor is configured to perform the password reset method in any one of the foregoing method embodiments.

It should be understood that, the processing apparatus may be a chip. For example, the processing apparatus may be an FPGA, an ASIC, a system on chip (SoC), a central processing unit (CPU), a network processor (NP), a DSP, a micro controller unit (MCU), a PLD, or another integrated chip.

An embodiment of this application further provides a system. The system includes the foregoing requester and verifier, and the requester needs to request, using an account and a password, the verifier to verify an identity.

An embodiment of this application further provides a computer-readable medium. The computer-readable medium stores a computer program. When the computer program is executed by a computer, the method in any one of the foregoing method embodiments is implemented.

An embodiment of this application further provides a computer program product. When the computer program product is executed by a computer, the method in any one of the foregoing method embodiments is implemented.

All or some of the foregoing embodiments may be implemented using software, hardware, firmware, or any combination thereof. When the embodiments are implemented using software, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that the foregoing processing apparatus may be a chip. The processor may be implemented by hardware, or may be implemented by software. When being implemented by the hardware, the processor may be a logic circuit, an integrated circuit, or the like. When being implemented by the software, the processor may be a general-purpose processor. When being implemented by reading software code stored in a memory, the memory may be integrated into the processor, or may exist independently outside the processor.

It should be understood that first, second, third, fourth, and various serial numbers in this specification are merely used for distinction for ease of description, but are not intended to limit the scope of the embodiments of this application.

Terminologies such as "component", "module", and "system" used in this specification are used to indicate computer-related entities, hardware, firmware, combinations of hardware and software, software, or software being executed. For example, a component may be, but is not limited to, a process that is run on a processor, a processor, an object, an executable file, an execution thread, a program, and/or a computer. As shown in figures, both a computing device and an application that is run on the computing device may be components. One or more components may reside within a process and/or an execution thread, and the components may be located on one computer and/or distributed between two or more computers. In addition, these components may be executed from various computer-readable media that store various data structures. For example, the components may perform, using a local process and/or a remote process, communication based on a signal having one or more data packets (for example, data from two components interacting with another component in a local system, a distributed system, and/or across a network such as the Internet interacting with another system using a signal).

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" in this specification may be often used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification usually indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only. B may be alternatively determined according to A and/or other information.

A person of ordinary skill in the art may be aware that, in combination with the embodiments disclosed in this specification, units and algorithm steps in the examples can be implemented by electronic hardware, computer software, or a combination thereof. To clearly describe the interchangeability between hardware and software, the foregoing has generally described compositions and steps of each example based on functions. Whether the functions are performed by hardware or software depends on a particular application and a design constraint condition of a technical solution. A person skilled in the art may use different methods to implement the described functions for each particular application, but it should not be considered that the implementation goes beyond the scope of this application.

It may be clearly understood by the person skilled in the art that, for convenience and brevity of description, for specific working processes of the system, apparatus, and unit described above, refer to corresponding processes in the foregoing method embodiments. Details are not described herein again.

In the several embodiments provided in this application, it should be understood that, the disclosed system, apparatus, and method may be implemented in other manners. For example, the described apparatus embodiment is merely an example. For example, the unit division is merely logical function division. There may be another division manner in actual implementation. For example, a plurality of units or components may be combined or integrated into another system, or some features may be ignored or not performed. In addition, displayed or discussed mutual couplings or direct couplings or communication connections may be indirect couplings or communication connections using some interfaces, apparatuses, or units, and may be connections in an electrical form, a mechanical form, or another form.

The units described as separate parts may or may not be physically separate, and parts displayed as units may or may not be physical units, that is, may be located in one position, or may be distributed on a plurality of network units. Some or all of the units may be selected based on an actual requirement to achieve the objectives of the solutions of the embodiments in this application.

In addition, functional units in the embodiments of this application may be integrated into one processing unit, or each of the units may exist alone physically, or two or more units may be integrated into one unit. The integrated units may be implemented in a form of hardware, or may be implemented in a form of a software functional unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in the computer-readable medium. The computer-readable medium includes a computer storage medium and a communications medium, and the communications medium includes any medium that facilitates transmission of a computer program from one place to another. The storage medium may be any available medium accessible to a computer. The following provides an example but does not impose any limitation. The computer-readable medium may include a RAM, a ROM, an EEPROM, a compact disc (CD) ROM (CD-ROM) or another optical disc storage, a magnetic disk storage medium or another magnetic storage device, or any other medium that can carry or store expected program code in a form of an instruction or a data structure and is accessible to a computer. In addition, any connection may be appropriately defined as a computer-readable medium. For example, if software is transmitted from a website, a server, or another remote source using a coaxial cable, an optical fiber/cable, a twisted pair, a DSL, or wireless technologies such as infrared, radio, and microwave, the coaxial cable, the optical fiber/cable, the twisted pair, the DSL, or the wireless technologies such as the infrared, the radio, and the microwave are included in fixation of a medium to which they belong. A disk and a disc used in this application includes a CD, a laser disc, an optical disc, a DVD, a floppy disk, and a BLU-RAY DISC. The disk usually copies data in a magnetic manner, but the disc copies data optically using a laser. The foregoing combination should also be included in the protection scope of the computer-readable medium.

In summary, the foregoing descriptions are merely example embodiments of the technical solutions of this application, but are not intended to limit the protection scope of this application. Any modification, equivalent replacement, or improvement made without departing from the principle of this application shall fall within the protection scope of this application.

What is claimed is:

1. A method for identity verification, implemented by a verifying device, the method comprising:
   receiving first account information from a requesting device requesting to reset a first password corresponding to a first account;
   determining that the first account is invalid;
   creating a fake identification corresponding to the first account in response to determining that the first account is invalid;
   sending the fake identification to the requesting device to display the fake identification;
   sending a first verification request to the requesting device, wherein the first verification request requests a user to determine whether to send verification information to a first communication address, and wherein the fake identification and the first communication address are associated with the first account;
   receiving second account information from the requesting device requesting to reset a second password corresponding to a second account;
   determining that the second account is valid;
   retrieving a true identification corresponding to the second account in response to determining that the second account is valid;
   sending the true identification to the requesting device to display the true identification to the user; and
   sending a second verification request to the requesting device, wherein the second verification request requests the user to determine whether to send verification information to a second communication address, and wherein the true identification and the second communication address are associated with the second account.

2. The method of claim 1, wherein the fake identification is identical to the first communication address, and wherein the true identification is identical to the second communication address.

3. The method of claim 1, further comprising:
   obtaining a first message from the requesting device, wherein the first message indicates that the user has determined to send the verification information; and
   sending, to the requesting device, a first response message in response to the first message, wherein the first response message prompts the user that the verifying device has already sent the verification information to the second communication address.

4. The method of claim 1, further comprising creating, based on the first account, the fake identification corresponding to the first account.

5. The method of claim 1, wherein the first communication address comprises an anonymous part, and wherein the first verification request further enables the requesting device to request the user to enter the anonymous part.

6. The method of claim 5, further comprising:
   obtaining a second message from the requesting device, wherein the second message comprises the anonymous part received from the user; and
   sending, to the requesting device, a second response message, wherein the second response message enables the requesting device to prompt the user that the verifying device has sent the verification information to the first communication address.

7. The method of claim 1, wherein the second communication address comprises anonymous information, wherein the second verification request further enables the requesting device to request the user to enter the anonymous part, and wherein the method further comprises:
   obtaining a third message from the requesting device, wherein the third message comprises the anonymous part received from the user;
   identifying that the anonymous part received from the user is incorrect; and
   sending, to the requesting device, a third response message, wherein the third response message enables the requesting device to prompt the user that the verifying device has sent the verification information to the second communication address.

8. The method of claim 1, wherein the fake identification and the true identification comprise anonymous information.

9. A verifier apparatus comprising:
   a memory configured to store computer executable instructions; and
   a processor coupled to the memory, wherein the computer executable instructions cause the processor to be configured to:
      receive first account information from a requesting device requesting to reset a first password corresponding to a first account;

determine that the first account is invalid;
create a fake identification corresponding to the first account in response to determining that the first account is invalid;
send the fake identification to the requesting device to display the fake identification;
send a first verification request to the requesting device, wherein the first verification request is configured to request the user to determine whether to send verification information to a first communication address, and wherein the fake identification and the first communication address are associated with the first account;
receive second account information from the requesting device requesting to reset a second password corresponding to a second account;
determine that the second account is valid;
retrieve a stored true identification corresponding to the second account in response to determining that the second account is valid;
send the true identification to the requesting device to display the true identification to the user; and
send a second verification request to the requesting device, wherein the second verification request requests the user to determine whether to send verification information to a second communication address, and wherein the true identification and the second communication address are associated with the second account.

10. The verifier apparatus of claim 9, wherein the fake identification is identical to the first communication address, and wherein the true identification is identical to the second communication address.

11. The verifier apparatus of claim 9, wherein the computer executable instructions further cause the processor to be configured to:
obtain a first message from the requesting device, wherein the first message indicates that the user determines to send the verification information; and
send, to the requesting device, a first response message in response to the first message, wherein the first response message prompts the user that the verifier device has already sent the verification information to the second communication address.

12. The verifier apparatus of claim 9, wherein the computer executable instructions further cause the processor to be configured to create the fake identification based on the first account.

13. The verifier apparatus of claim 9, wherein the first communication address comprises an anonymous part, and wherein the first verification request further enables the requesting device to request the user to enter the anonymous part.

14. The verifier apparatus of claim 13, wherein the computer executable instructions further cause the processor to be configured to:
obtain a second message from the requesting device, wherein the second message comprises the anonymous part received from the user; and
send, to the requesting device, a second response message, wherein the second response message enables the requesting device to prompt the user that the verifier device has sent the verification information to the first communication address.

15. The verifier apparatus of claim 9, wherein the second communication address comprises anonymous information, wherein the second verification request further enables the requesting device to request the user to enter the anonymous part of the second communication address, and wherein the computer executable instructions further cause the processor to be configured to:
obtain, a third message from the requesting device, wherein the third message comprises the anonymous part received from the user;
identify that the anonymous part received from the user is incorrect; and
send, to the requesting device, a third response message, wherein the third response message enables the requesting device to prompt the user that the verifier device has sent the verification information to the second communication address.

16. The verifier apparatus of claim 9, wherein the fake identification and the true identification comprise anonymous information.

17. A computer program product comprising computer-executable instructions for storage on a non-transitory computer-readable medium that, when executed by a processor, cause an apparatus to:
receive first account information from a requesting device requesting to reset a first password corresponding to a first account;
determine that the first account is invalid;
create a fake identification corresponding to the first account in response to the determining that the first account is invalid;
send the fake identification to the requesting device to display the fake identification;
send a first verification request to the requesting device, wherein the first verification request requests a user to determine whether to send verification information to a first communication address, and wherein the fake identification and the first communication address are associated with the first account;
receive second account information from the requesting device requesting to reset a second password corresponding to a second account;
determine that the second account is valid;
retrieve a stored true identification corresponding to the second account in response to the determining that the second account is valid;
send the true identification to the requesting device to display the true identification to the user; and
send a second verification request to the requesting device, wherein the second verification request requests the user to determine whether to send verification information to a second communication address, and wherein the true identification and the second communication address are associated with the second account.

18. The computer program product of claim 17, wherein the instructions further cause the apparatus to:
obtain a first message from the requesting device, wherein the first message indicates that the user has determined to send the verification information; and
send, to the requesting device, a first response message in response to the first message, wherein the first response message prompts the user that the apparatus has already sent the verification information to the second communication address.

19. The computer program product of claim 17, wherein the instructions further cause the apparatus to create, based on the first account, the fake identification corresponding to the first account.

20. The computer program product of claim 17, wherein the first communication address comprises an anonymous part, and wherein the first verification request further enables the requesting device to request the user to enter the anonymous part.

\* \* \* \* \*

UNITED STATES PATENT AND TRADEMARK OFFICE
CERTIFICATE OF CORRECTION

PATENT NO. : 11,388,194 B2  
APPLICATION NO. : 16/899163  
DATED : July 12, 2022  
INVENTOR(S) : Duanhao Ou Page 1 of 1

It is certified that error appears in the above-identified patent and that said Letters Patent is hereby corrected as shown below:

On the Title Page

Item (71) Applicant: "Huawei Cloud Computing Technologies Co., Ltd., Shenzhen (CN)" should read "Huawei Cloud Computing Technologies Co., Ltd., Guizhou (CN)"

Signed and Sealed this  
Sixth Day of September, 2022

Katherine Kelly Vidal  
*Director of the United States Patent and Trademark Office*